United States Patent
Cimini, Jr. et al.

(10) Patent No.: US 6,327,314 B1
(45) Date of Patent: Dec. 4, 2001

(54) METHOD AND APPARATUS FOR CHANNEL ESTIMATION FOR MULTICARRIER SYSTEMS

(75) Inventors: Leonard Joseph Cimini, Jr., Howell; Ye Li, Atlantic Highlands; Nelson Ray Sollenberger, Tinton Falls, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/089,862

(22) Filed: Jun. 3, 1998

Related U.S. Application Data

(63) Continuation-in-part of application No. 09/053,281, filed on Apr. 1, 1998, now Pat. No. 5,973,642.

(51) Int. Cl.⁷ ............................ H03D 1/00; H04L 27/06
(52) U.S. Cl. ...................... 375/340; 375/347; 342/378; 455/63
(58) Field of Search .................................. 375/340, 347, 375/349, 350, 229, 230, 232, 233, 354; 342/378; 455/63

(56) References Cited

U.S. PATENT DOCUMENTS

| | | | |
|---|---|---|---|
| 5,445,156 * | 8/1995 | Daft et al. ........................... | 600/454 |
| 5,483,550 * | 1/1996 | Hulbert ............................... | 375/134 |
| 5,524,023 * | 6/1996 | Tsujimoto ........................... | 375/232 |
| 5,550,872 * | 8/1996 | Liberti, Jr. et al. ................. | 375/347 |
| 5,559,757 * | 9/1996 | Catipovic et al. .................. | 367/134 |
| 5,642,732 * | 7/1997 | Wang .................................. | 600/453 |
| 5,771,439 * | 6/1998 | Kennedy, Jr. et al. .............. | 455/63 |
| 5,822,368 * | 10/1998 | Wang .................................. | 375/229 |
| 5,867,532 * | 2/1999 | Ito et al. ............................. | 375/265 |
| 5,953,365 * | 9/1999 | Badke ................................ | 375/152 |
| 5,973,642 * | 10/1999 | Li et al. .............................. | 342/378 |
| 6,052,702 * | 4/2000 | Berberidis et al. ................. | 708/319 |
| 6,055,268 * | 4/2000 | Timm et al. ........................ | 375/229 |
| 6,072,782 * | 6/2000 | Wu ..................................... | 370/286 |

* cited by examiner

Primary Examiner—Stephen Chin
Assistant Examiner—Lenny Jiang

(57) ABSTRACT

A method and apparatus provide channel estimation for multicarrier systems. A minimum mean-square-error (MMSE) channel estimator makes full use of time-and frequency-domain correlations of the frequency response of time-varying dispersive fading channels. A robust channel estimator that is insensitive to the channel statistics is provided. The robust channel estimator can significantly improve the performance of a multicarrier system such as an orthogonal frequency division multiplexing (OFDM) modulation system in a rapid dispersive fading channel. In addition, the estimation process can employ a new reference generator which can select the source of the reference signal as being a decoded or undecoded signal depending on the correction success rate of the decoder.

19 Claims, 17 Drawing Sheets

METHOD AND APPARATUS FOR CHANNEL ESTIMATION FOR MULTICARRIER SYSTEMS

This application is a continuation-in-part of U.S. patent application Ser. No. 09/053,281, filed Apr. 1, 1998, now issued U.S. Pat. No. 5,973,642.

BACKGROUND OF THE INVENTION

The present invention is directed to a method and apparatus for estimating a wireless communication channel. More particularly, the present invention is directed to a method and apparatus for providing robust channel estimation in a multicarrier communication system.

As wireless communications demands continue to grow the goal is to be able to provide effective communication channels capable of transporting a wide range of information. As one example it has become desirable to provide wireless services capable of transporting multimedia information such as, for example high definition television. Multimedia wireless services require high-bit-rate transmission over radio channels. Those radio channels can provide mobile communications. One technique for reducing the effect of intersymbol interferences (ISI) caused by the dispersive Rayleigh fading environment is to make the symbol duration much larger than the channel delay spread. This can be achieved using a multicarrier configuration. One example of such a configuration is orthogonal frequency division multiplexing (OFDM) on which the entire channel is divided into many narrow subchannels, which are transmitted in parallel, thereby, increasing the symbol duration and reducing the ISI.

Orthogonality is a property of a set of functions such that the integral of the product of any two members of the set taken over the appropriate interval is zero. (For discrete functions summing is done rather than integrating.) For example, trigonometric functions appearing in Fourier expansions (e.g., sines and cosines) are orthogonal functions.

Orthogonality ensures that a receiver demodulating a selected carrier demodulates only that carrier without simultaneously and unintentionally demodulating the other carriers that are providing parallel data transmission along the multiplexed communication channel. Accordingly, there is no cross talk between carriers even though the carrier spectra overlap and there is no requirement of explicit filtering.

Therefore, OFDM is an effective technique for combating multipath fading and for providing high-bit-rate transmission over mobile wireless channels.

It is known to use differential demodulation, for example differential phase shift keying (DPSK) in OFDM systems to avoid system complexities that would otherwise arise from having to track a time varying channel. This differential demodulation technique comes at the expense of a 3–4 dB loss in signal-to-noise ratio (SNR) compared with coherent demodulation. If there is an accurate estimate of the channel characteristics that can be used to adjust the received signal, then the channel OFDM system performances can be improved by allowing for coherent demodulation. Furthermore, for systems with receiver diversity, optimum combining can be obtained by means of channel estimators.

It is well known that the structure of an OFDM signal allows a channel estimator to use both time correlation and frequency correlation. An ideal estimator would have a two dimensional structure that attempts to estimate the channel response in time and frequency.

It is suggested in one paper that such a two-dimensional estimator structure is generally too complex for a practical implementation. See OFDM CHANNEL ESTIMATION BY SINGULAR VALUE DECOMPOSITION, Edfors, et al. VTC '96, pp. 923–927. Additionally, it is known in the art to provide an estimator using only frequency correlation to avoid the complexities otherwise involved in utilizing time and frequency correlation. In one example an estimator considers minimum mean square error (MMSE) and least squares (LS) estimations.

It would be advantageous to provide estimation that takes advantage of both the time and frequency correlation of the channel while avoiding the complexities alluded to in the prior art. It would also be advantageous if that estimation could be robust, that is the estimator would provide good transmission characteristics over a widely varying channel which can easily arise in a mobile communication environment.

SUMMARY OF THE INVENTION

The present invention addresses the concerns known in the art by providing a robust channel estimator that can be employed in a multicarrier wireless communication system. In accordance with one embodiment of the invention the estimator is used in an OFDM system and is a minimum mean-square error (MMSE) estimator, that makes full use of the correlation of the channel frequency response at different times and frequencies. In particular, for mobile wireless channels, the correlation of channel frequency response at different times and frequencies can be separated into the multiplication of the time- and frequency-domain correlation functions. Hence, an MMSE channel estimator can be a frequency-domain filter using a Fast Fourier Transform (FFT), followed by time-domain filters. Since the channel statistics, which depend on the particular environment, are usually unknown, it is advantageous to provide a robust estimator, that is, an estimator which is insensitive to the channel statistics.

In addition the present invention provides a unique reference generator with respect to the estimation process. In particular, the reference signal can be derived from a number of different sources. Either decoded information or undecoded information can form the basis for the reference generation operation.

BRIEF DESCRIPTION OF THE DRAWINGS

FIG. 3($b$) is graph of NMSE of channel estimator versus Doppler frequency as a function of $f_d t_d$ when SNR=10 dB.

FIG. 4($b$) is a graph of NMSE-NMSEo versus the length of FIR channel estimator as a function of $f_d$ with $t_d$=20 $\mu$sec.

FIG. 4($c$) is a graph of NMSE versus the length of FIR channel estimator as a function of $t_d$ with $f_d$=40 Hz.

FIG. 4($d$) is a graph of NMSE-NMSEo versus the length of FIR channel estimator as a function of $t_d$ with $f_d$=40 Hz.

DETAILED DESCRIPTION

Overview of the Invention

Figure 1:
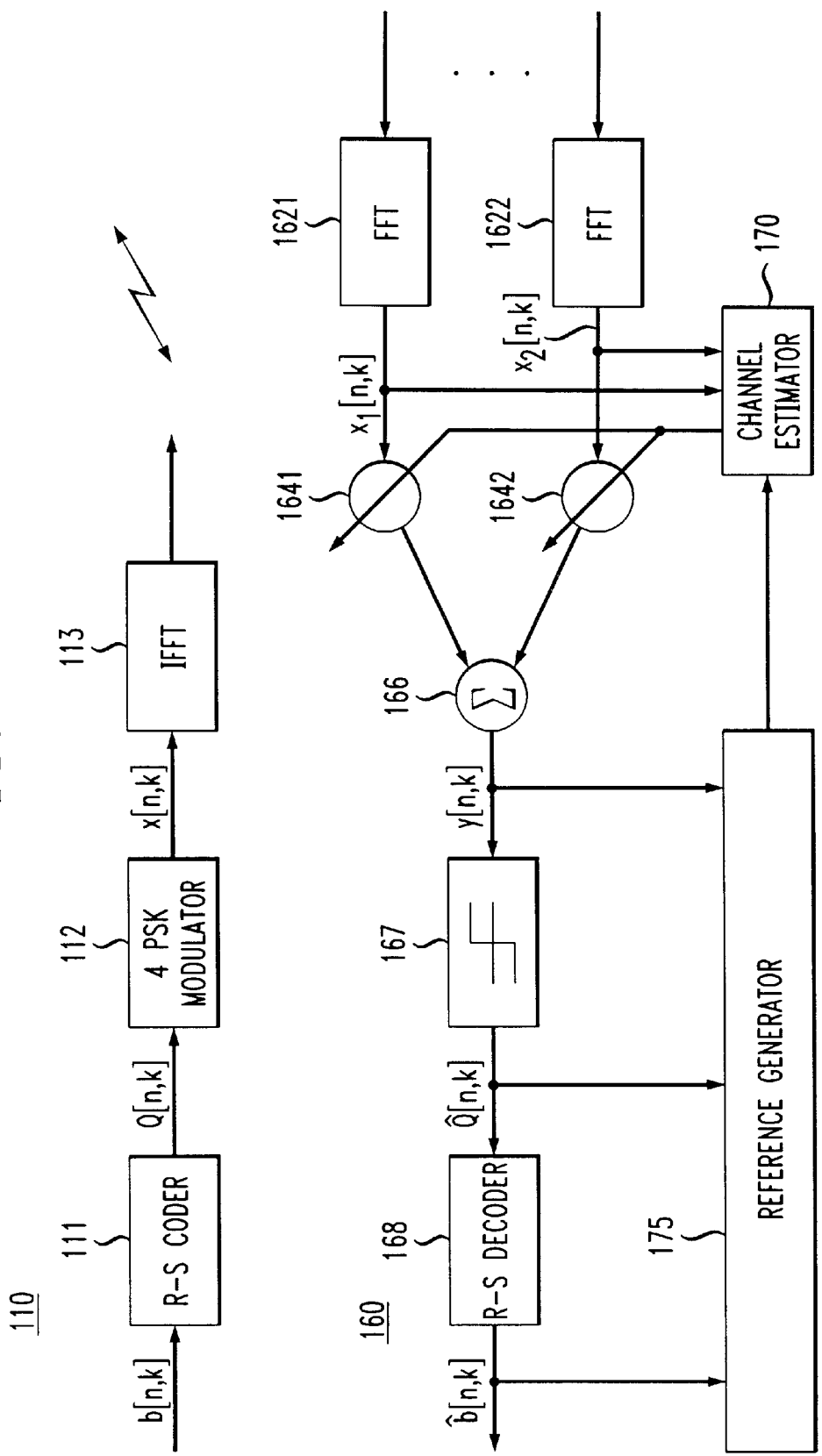
FIG. 1 illustrates a block diagram of an example of a system in which the resent invention can be implemented.

The present invention provides a channel estimator for use in a multi-carrier system. In the particular example shown the system is an orthogonal frequency division multiplexing system. Other multi-carrier systems may take advantage of this system by appropriately modifying the equations set forth in the proofs that follow this overview. An example of a system in which the present invention can be implemented is shown in FIG. 1. The system includes a transmitter 110 and a receiver 160. In this example the receiver has a property called diversity, that is there are multiple receiver antennas adapted to receive channels that have traversed different paths. It is possible in one example that the antennas be arranged to have different orientation, but this is not necessary. Furthermore, the invention need not employ multiple antennas. Instead, the invention described below can be adapted to a single antenna environment.

In the transmitter, encoder 111 receives a data signal, for example b[n, k], which is a signal constituted by multiple blocks of data, each block having a number of tones ("n" refers to the time channels where a plurality of blocks of tones are transmitted over time; "k" refers to the tone(s) in a given block). It is assumed that a "b[n, k]" has unit variance and the data symbols are independent. The code across tones is utilized in the system to correct burst errors that can result from frequency-selective fading. In one embodiment the encoder is a Reed-Solomon (R-S) encoder, although other encoders may be employed. The output of the coder, a[n, k], is the signal modulating the k-th tone during the n-th block. The output of the coder is supplied to modulation module 112 which produces output x[n, k] to be supplied to inverse fast fourier transformer (IFFT) 113 whose output is transmitted over the radio channel. In one embodiment this module provides QPSK modulation but other modulation techniques could be used. Note that since the phase of each sub-channel can be obtained by the channel estimator in the receiver as described below, coherent detection is used to enhance system performance. Thus, the transmitted signal comprises the OFDM signals.

At the receiver 160 each receiver antenna, (not shown) provides its received signal to a corresponding FFT module, e.g., 1621, 1622, 162P where p equals the number of receiver antennas and thus channels. The outputs of these FFTs are shown as $x_1$[n, k], ... $x_p$[n, k]. All of these received signals are supplied to a channel estimator 170. They are also supplied to their own corresponding signal adjuster, e.g., 1641, 1642, ... 164P. The outputs of the adjusters are coupled to a summing device 166 which yields as an output y[n, k]. This latter signal is supplied to a reference generator 175 and a demodulator 167. The output of the demodulator â[n, k] is also supplied to the reference generator and is further supplied to a decoder 168. Again, the decoder need only complement the encoder, but in the specific embodiment described the decoder is a R-S decoder. The output of the R-S decoder b̂[n, k], under ideal conditions, would completely match b[n, k] the input to the transmitter. The output of the R-S decoder is yet another input to the reference generator 175. The output of the reference generator 175, ã[n, k], provides another input to channel estimator 170. The estimator generates adjustment parameters Ĥ[n, k], ... Ĥ[n, k] that adapt the receiver to the detected characteristics of the various channels.]

As will be described in the proofs and equations that follow this overview, a correlation function $r_H$[n, k] of the channel frequency response H[n, k] over all of the channels can be separated into the multiplication of a time-domain correlation $r_t$[n] and a frequency-domain correlation $r_f$[k]. The time domain correlation is dependent upon the speed of relative movement between a receiver and a transmitter or equivalently the Doppler frequency. On the other hand, the frequency-domain correlation depends on the multipath delay spread.

Using this separation property, a channel estimator is created using minimum mean square error estimations.

Figure 2:
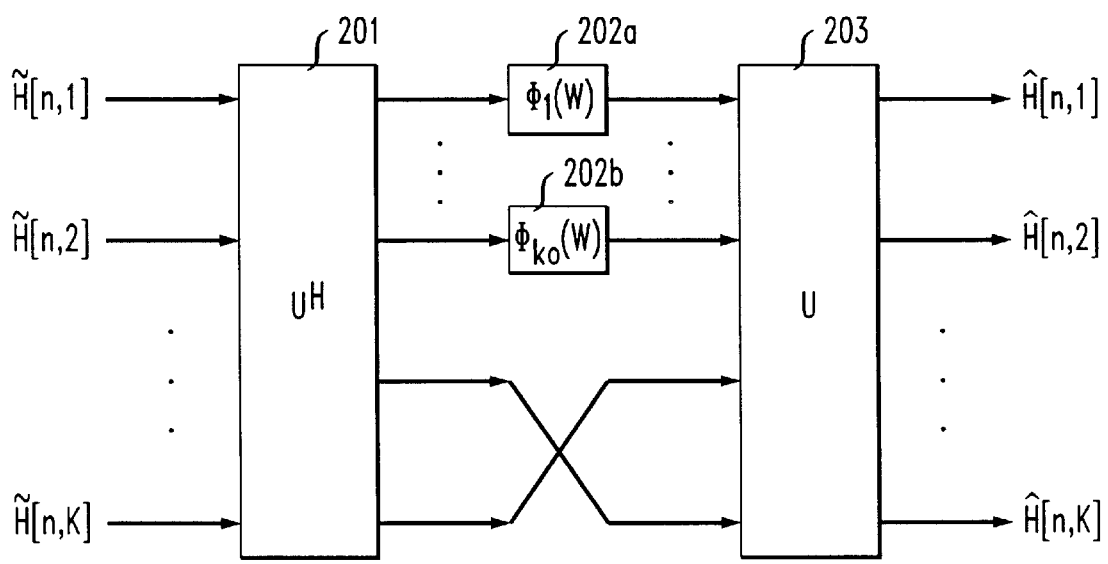
FIG. 2 illustrates a block diagram of components forming part of a channel estimator in accordance with an embodiment of the present invention.

The estimator provides two dimensional filtering, that is, in both time and frequency. As shown in FIG. 2 the channel estimator includes two frequency transformation blocks, 201 and 203, and a plurality of filters, 202a, 202b, that exploit the time correlation of the channel parameters. The details of the transform modules and the filters will be described below. It is believed, however, that this unique arrangement of filters, namely placing the time correlation based filters in the middle of the estimator, between the frequency transformation operations is very beneficial because it achieves good channel matching without need for high computational complexity. This contrasts with what would be required to achieve two-dimensional filtering based on the disclosure by Edfors et al. described above.

Once the channel statistics, such as the time-domain correlation and frequency-domain correlation are known, the optimum channel estimator can be designed. However, in the mobile wireless links, the channel statistics depend on the particular environments, for example indoor or outdoor, urban or suburban, and change with time. Hence, it may not always be advantageous to design a channel estimator that tightly matches the channel statistics. Therefore, it may be beneficial to use information about performance degradation that can arise from a mismatch of the estimator to the channel statistics to provide a more robust estimator design.

More specifically, in accordance with an embodiment of the present invention, coefficients for the estimator calculations, e.g., the time correlated filters, are set taking into account a maximum delay spread and are chosen to match a rectangular spectrum rather than attempting to match the doppler spectrum. By properly choosing the coefficients the estimator is largely insensitive to particular changes in the channel characteristics such as might arise where at least one of the transmitter and receiver are moving relative to the other. Subsequent description will set forth a comparison of performance of the robust filter and exact matching filters under both known and unknown conditions.

The present invention also includes the notion of selecting a reference generator for use with the channel estimator. More specifically, as illustrated in FIG. 1 the reference generator receives y[n, k] from summer 166, â[n, k] from demodulator 167, and b̂[n, k] from decoder 168. If the decoder can successfully correct the received signal, then b̂[n, k] will be used to generate the reference signals â[n, k]. If the decoder cannot successfully correct then the output of the demodulator, signal â[n, k] is used to generate the reference since otherwise the decoder would create more errors for the system by propagating the uncorrected errors to the reference generator. Thus this decoded/undecoded dual mode reference generator further suppresses error propagation in the robust channel estimator of the present invention.

Proofs and Calculations Supporting the Invention

Statistics Related to Mobile Radio Channels

It is known that a complex baseband representation of a mobile wireless channel impulse response can be described by $$h(t, \tau) = \sum_{k} \gamma_k(t) \delta(\tau - \tau_k) \quad (1)$$

where $\tau_k$ is the delay of the k-th path and $\gamma_k(t)$ is the corresponding complex amplitude. Due to the nature of the environment $\gamma_k(t)$'s are wide-sense stationary (WSS), narrow-band complex Gaussian processes, which are independent for different paths.

It is assumed that $\gamma_k(t)$ has the same normalized correlation function $r_t(\Delta t)$ for all k, and therefore, the same normalized power spectrum $p_t(\Omega)$. Hence, $$r_{\gamma_k}(\Delta t) \triangleq E\{\gamma_k(t + \Delta t)\gamma_k^*(t)\} \quad (2)$$
$$= \sigma_k^2 r_t(\Delta t),$$

where $\sigma_k^2$ is the average power of the k-th path.

From Jakes' model as described in Microwave Mobile Communications, Jakes, IEEE Press, 1974, the normalized power spectrum is $$p_J(\Omega) = \begin{cases} \dfrac{2}{\Omega_d} \dfrac{1}{\sqrt{1 - (\Omega/\Omega_d)^2}} & \text{if } |\Omega| < \Omega_d \\ 0 & \text{otherwise} \end{cases} \quad (3)$$

and therefore, $$r_t(\Delta t) \triangleq F^{-1}\{p_J(\Omega)\} = J_0(\Omega_d \Delta t), \quad (4)$$

where $J_0(x)$ is the zero-order Bessel function of the first kind, $\Omega_d = 2\pi f_d$ and $f_d$ is the Doppler frequency, which is related to the vehicle speed v and the carrier frequency $f_c$ by $$f_d = \dfrac{v f_c}{c}, \quad (5)$$

where c is the speed of light. For example, for a system where the user is moving at 60 miles/hour and there is a carrier frequency $f_c=2$ GHz, then $f_d=184$ Hz.

Using (1), the frequency response of the time-varying radio channel at time t is $$H(t, f) \triangleq \int_{-\infty}^{\infty} h(t, \tau) e^{-j2\pi f \tau} d\tau \quad (6)$$
$$= \sum_{k} \gamma_k(t) e^{-j2\pi f \tau_k}.$$

Hence, the correlation function of the frequency response for different times and frequencies is $$r_H(\Delta t, \Delta f) \triangleq E\{H(t + \Delta t, f + \Delta f)H^*(t, f)\} \quad (7)$$
$$= \sum_{k} r_{\gamma_k}(\Delta t) e^{-j2\pi \Delta f \tau_k}$$
$$= r_t(\Delta t) \left( \sum_{k} \sigma_k^2 e^{-j2\pi \Delta f \tau_k} \right)$$
$$= \sigma_H^2 r_t(\Delta t) r_f(\Delta f),$$

where $\sigma_H^2$ is the total average power of the channel impulse response defined as $$\sigma_H^2 \triangleq \sum_{k} \sigma_k^2, \quad (8)$$

and $$r_f(\Delta f) = \sum_{k} \dfrac{\sigma_k^2}{\sigma_H^2} e^{-j2\pi \Delta f \tau_k}. \quad (9)$$

It is obvious that $r_t(0) = r_f(0) = 1$. Without loss of generality, we also assume that $\sigma_H^2 = 1$, which, therefore, can be omitted from (7).

From (7), the correlation function of H(t,f) can thus be separated into the multiplication of a time-domain correlation $r_t(\Delta t)$ and a frequency-domain correlation $r_f(\Delta f)$ as described above in the overview section. $r_t(\Delta t)$ is dependent on the speed, for example, of the receiver relative to the transmitter, or, equivalently the Doppler frequency, while $r_f(\Delta f)$ depends on the multipath delay spread. As described above, this separation property, is useful in simplifying our MMSE channel estimator as described in the next section.

For an OFDM system with block length $T_f$ and tone spacing (subchannel spacing) $\Delta f$, the correlation function for different blocks and tones can be written as $$r_H[n,k] = r_t[n] r_f[k], \tag{10}$$

where $$r_t[n] \triangleq r_t(nT_f), \text{ and } r_f[k] \triangleq r_f(k\Delta f). \tag{11}$$

Let $p_1(\omega)$ represent the Fourier transform (FT) of the discrete sequence $\{r_t[n]\}$. Then, for Jake's model, from (3), the FT of $r_t[n]$ is $$p_J(\omega) = \begin{cases} \dfrac{2}{\omega_d} \dfrac{1}{\sqrt{1-(\omega/\omega_d)^2}} & \text{if } |\omega| < \omega_d \\ 0 & \text{otherwise} \end{cases} \tag{12}$$

where $\omega_d = 2\pi T_f f_d$.

A Channel Estimator

As described in the overview section for a diversity receiver, the signal from the m-th antenna at the k-th tone and the n-th block can be expressed as a signal based on the transmitted signal a[n, k] as influenced by the channel characteristics and noise. This can be expressed as $$x_m[n,k] = H_m[n,k] a[n,k] + W_m[n,k]. \tag{13}$$

In the above expression, $W_m[n,k]$ is additive Gaussian noise from the m-th antenna at the k-th tone and the n-th block, with zero-mean and variance 92. *It is also assumed that $W_m[n,k]$ is independent for different n's, k's, or m's.* $H_m[n,k]$, the frequency response at the k-th tone and the n-th block corresponding to the m-th antenna, is assumed independent for different m's, but with the same statistics. a[n,k] is the signal modulating the k-th tone during n-th block, and is assumed to have unit variance and be independent for different k's and n's.

With knowledge of the channel parameters, a[n,k] can be estimated as y[n,k], by a minimum mean-square-error combiner, $$y[n,k] = \dfrac{\sum_{m=1}^{p} H_m^*[n,k] x_m[n,k]}{\sum_{m=1}^{p} |H_m^*[n,k]|^2} \tag{14}$$

However, the multipath channel parameters are time-varying and are usually unknown. Hence, a channel estimation algorithm must be derived to obtain accurate estimation of the channel parameters.

Since the channel corresponding to each antenna has the same statistics, the channel estimator for each antenna has the same coefficients. Furthermore, the estimator for each antenna works independently since the signal from the other antennas carries no information about the channel parameters corresponding to this antenna. Therefore, the subscript m is eliminated from $H_m[n,k]$, in the next two subsections.

*cl MMSE Channel Estimation*

If the reference generator 175 in FIG. 1 can generate an ideal reference a[n,k], then a temporal estimation of H[n,k] can be obtained as $$\tilde{H}[n,k] = x[n,k] a^*[n,k] \tag{15}$$
$$= H[n,k] + W[n,k] a^*[n,k],$$

where the superscript * denotes the complex conjugate. H[n,k]'s for different n's, and k's are correlated; therefore, a minimum mean square error (MMSE) MMSE channel estimator can be constructed as follows, $$\hat{H}[n,k] = \sum_{m=-\infty}^{0} \sum_{l=-(K-k)}^{k-1} c[m,l,k] \tilde{H}[n-m, k-l], \tag{16}$$

where c[m,l,k]'s are selected to minimize $$MSE(\{c[m,l,k]\}) = E\big|\hat{H}[n,k] - H[n,k]\big|^2. \tag{17}$$

K, in the above expression, is the number of tones in each OFDM block. Denote $$c[m,k] \triangleq \begin{pmatrix} c[m, k-1, k] \\ \vdots \\ c[m, 0, k] \\ \vdots \\ c[m, -K+k, k] \end{pmatrix} \tag{18}$$

$$c(\omega; k) \triangleq \sum_{n=-\infty}^{0} c[n,k] e^{-jn\omega}, \tag{19}$$

and $$C(\omega) \triangleq (c(\omega;1), c(\omega;2), \ldots, c(\omega;K)). \tag{20}$$

Then, using the separation property (10), it can be shown that the estimator coefficients are given by $$C(\omega) = U^H \Phi(\omega) U. \tag{21}$$

In the above expression, $\Phi(\omega)$ is a diagonal matrix with the l-th diagonal element $$\Phi_l(\omega) = 1 - \dfrac{1}{M_l(-\omega)\gamma_l[0]}, \tag{22}$$

where $M_l(\omega)$ is a stable one-sided Fourier transform $$M_l(\omega) = \sum_{n=0}^{\infty} \gamma_l[n] e^{-j\omega}, \tag{23}$$

which is uniquely determined by $$M_l(\omega)M_l(-\omega) = \frac{d_l}{\rho} p_t(\omega) + 1. \tag{24}$$

A dc component, $\gamma_l[0]$ in $M_l(\omega)$ can be found by $$\gamma_l^2[0] = \exp\left\{\frac{1}{2\pi}\int_{-\pi}^{\pi}\ln\left[\frac{d_l}{\rho}pt(\omega)+1\right]d\omega\right\}. \tag{25}$$

The $d_l$'s and $u_1$'s are the corresponding eigenvalues and eigenvectors of frequency-domain correlation matrix $R_f$, defined as $$R_f \triangleq \begin{pmatrix} r_f[0] & r_f[1] & \cdots & r_f[K-1] \\ r_f[-1] & r_f[0] & \cdots & r_f[K-2] \\ \vdots & \ddots & \ddots & \vdots \\ r_f[-K+1] & r_f[-K+2] & \cdots & r_f[0] \end{pmatrix}, \tag{26}$$

and $U=(u_1,\ldots,u_k)$, which is obviously a unitary matrix.

An MMSE channel estimator is shown in FIG. 2. The unitary linear inverse transform $U^H$ and transform $U$ in the figure perform the eigen-decomposition of the frequency-domain correlation. The estimator turns off the zero or small $d_l$'s to reduce the estimator noise. For those large $d_l$'s, linear filters are used to take advantage of the time-domain correlation.

As noted above, the MMSE estimator described here exploits the channel correlations in both the time- and frequency-domains, resulting in better performance than the estimators in the prior art. More specifically, the time correlation filter $\Phi(\omega)$ is placed within the frequency transform process, $U^H$, $U$ and as a consequence provides better channel estimation without an overwhelming amount of complex computations.

The average MMSE of the channel estimator is $$\overline{MMSE} \triangleq \sum_{k=1}^{K} E\left|\hat{H}[n,k] - H[n,k]\right|^2 \tag{27}$$

$$= \frac{\rho}{K}\sum_{l=1}^{K}\left(1 - \exp\left\{-\frac{1}{2\pi}\int_{-\pi}^{\pi}\ln\left[\frac{d_l}{\rho}p_t(\omega)+1\right]d\omega\right\}\right).$$

For Jakes' model, $p_t(\omega)=p_J(\omega)$. Then by direct calculation, $$\phi_l = 1 - \left(\frac{\alpha l}{2}\right)^{\frac{-\omega d}{\pi}}\exp\left(-\frac{\omega_d(b(\alpha_l)+1)}{\pi}\right), \tag{28}$$

and $$\overline{MMSE_J}(\omega_d) = \frac{\rho}{K}\sum_{l=1}^{K}1-\left(\frac{\alpha_l}{2}\right)^{\frac{-\omega d}{\pi}}\exp\left(-\frac{\omega_d(b(\alpha l)+1)}{\pi}\right), \tag{29}$$

where $$\alpha_l \triangleq \frac{2d_l}{\omega_d \rho}, \tag{30}$$

and $$b(\alpha_l) \triangleq \begin{cases} \frac{\pi}{2}\alpha_l - 1\sqrt{1-\frac{2}{1}}\ln\frac{1+\sqrt{1-\alpha_1^2}}{\alpha_l} & \text{if } \alpha_l < 1, \text{ and} \\ \frac{\pi}{2}\alpha_l - 1 - \sqrt{\alpha_1^2 - 1}\left(\frac{\pi}{2} - \arcsin\frac{1}{\alpha_l}\right) & \text{if } \alpha_l \geq 1. \end{cases} \tag{31}$$

If the time-domain correlation is ideal $\omega_d$ - bandlimited, i.e., $$P_B(\omega) \triangleq \begin{cases} \frac{\pi}{\omega_d} & \text{if } |\omega| \leq \omega_d, \\ 0 & \text{otherwise} \end{cases} \tag{32}$$

and then $$\phi_l = 1 - \frac{1}{\left(1+\frac{\pi d_l}{\omega_d \rho}\right)^{\frac{\omega_d}{\pi}}} \tag{33}$$

and $$\overline{MMSE_B}(\omega_d) = \frac{\rho}{K}\sum_{l=1}^{K}1 - \frac{1}{\left(1+\frac{\pi d_l}{\omega_d \rho}\right)^{\frac{\omega_d}{\pi}}}. \tag{34}$$

For any $\omega_d$-bandlimited function $p_t(\omega)$ satisfying $$\frac{1}{2\pi}\int_{-\omega_d}^{\omega_d} p_t(\omega)d\omega = 1, \tag{35}$$

we have $$\frac{1}{2\pi}\int_{-\pi}^{\pi}\ln\left[\frac{d_l}{\rho}p_B(\omega)+1\right]d\omega - \frac{1}{2\pi}\int_{-\pi}^{\pi}\ln\left[\frac{d_l}{\rho}p_t(\omega)+1\right]d\omega = \tag{36}$$

$$\frac{1}{2\pi}\int_{-\omega_d}^{\omega_d}\ln\left[\frac{d_l}{\rho}\frac{p_t(\omega)-\pi/\omega_d}{\pi/\omega_d+1}+1\right]d\omega \leq$$

$$\frac{1}{2\pi}\int_{-\omega_d}^{\omega_d}\frac{d_l}{\rho}\frac{p_t(\omega)-\pi/\omega_d}{\pi/\omega_d+1}dw = 0$$

with equality if and only if $p_t(\omega)=p_{\omega c}(\omega)$ almost everywhere. In the above derivation, the inequality $\ln(x+1) \leq x$ for all $x > -1$ has been used. Hence, $$\overline{MMSE}(\omega d) = \frac{P}{K}\sum_{l=1}^{K}1-\exp\left\{-\frac{1}{2\pi}\int_{-\pi}^{\pi}\ln\left[\frac{d_l}{\rho}p_t+(\omega)+1\right]d\omega\right\} \tag{37}$$

$$\leq \frac{P}{K}\sum_{l=1}^{K}1-\exp\left\{-\frac{1}{2\pi}\int_{-\pi}^{\pi}\ln\left[\frac{d_l}{\rho}p_\omega(\omega)+1\right]d\omega\right\}$$

$$= \overline{MMSE_B}(\omega_d).$$

The above inequality suggests that a channel with an ideal bandlimited time-domain correlation gives the worst MSE performance among all channels. *cl Robust Estimator*

Once the channel statistics, such as the time-domain correlation and frequency-domain correlation, are known, the optimum channel estimator can be designed. In mobile wireless links, however, where the channel statistics depend on the particular environments, for example, indoor or outdoor, urban or suburban, and change with time it is not robust to design a channel estimator that tightly matches the channel statistics.

In this subsection, the performance degradation due to a mismatch of the estimator to the channel statistics is analyzed and a robust estimator design approach is developed.

If an MMSE channel estimator is designed to match a channel with time- and frequency-domain correlations $\bar{r}_t[m]$ and $\bar{r}_f[l]$, respectively, then its coefficients $\bar{c}[m,l,k]$ are determined from equation (21) by $$\bar{C}(\omega) = \bar{U}^H \bar{\phi}(\omega) \bar{U}, \qquad (38)$$

where the definitions of $\bar{U}$ and $\bar{\phi}(\phi)$ are similar to those of $U$ and $\phi(\omega)$ except that $r_t[m]$ and $r_f[l]$ there are respectively substituted by $\bar{r}_t[m]$ and $\bar{r}_f[l]$.

For a channel with time- and frequency-domain correlations $r_t[m]$ and $r_f[l]$, rather than $\bar{r}_t[m]$ and $\bar{r}_f[l]$, from equation (17), the MSE for the designated channel estimator is $$MSE(\{\bar{c}[m,l,k]\}) = \sum_{k=1}^{K} \left\{ \sum_{m_1,m_2=-\infty}^{0} \sum_{l_1,l_2=-(K-k)}^{k-1} (\bar{c}[m_1,l_1,k] - \right.$$
$$\delta[m_1,l_1]r_t(m_2-m_1)r_f(l_2-l_1)(\bar{c}[m_2,l_2,k] -$$
$$\left. \delta[m_2,l_2])^* + \rho \sum_{m=-\infty}^{0} \sum_{l=-(K-k)}^{k-1} |\bar{c}[m,l,k]|^2 \right\} \qquad (39)$$

$$= \sum_{m_1,m_2=-\infty}^{0} r_t(m_2-m_1) Tr\{(\bar{C}[m_1] -$$
$$\delta[m_1]I) R_f (\bar{C}[m_2] - \delta[m_2]I)^H\} +$$
$$\rho \sum_{m=-\infty}^{0} Tr\{\bar{C}[m]\bar{C}^H[m]\}$$
$$= \frac{1}{2\pi} \int_{-\pi}^{\pi} p_t(\omega) Tr\{(\bar{C}(\omega) - I) R_f (\bar{C}(\omega) - I)^H\} d\omega +$$
$$\frac{\rho}{2\pi} \int_{-\pi}^{\pi} Tr\{\bar{C}(\omega)\bar{C}^H(\omega)\} d\omega,$$

where $\delta[m,l] = \delta[m]\delta[l]$ and $$\delta[n] = \begin{cases} 1 & \text{if } n = 0, \\ 0 & \text{otherwise.} \end{cases} \qquad (40)$$

Substituting (38) into (39), we obtain a general formula for the MSE of the channel estimator that does not match the channel statistics, $$MSE(\{\bar{c}[m,l,k]\}) = \frac{1}{2\pi} \int_{-\pi}^{\pi} p_t(\omega) Tr\{\bar{U}^H \bar{\Phi}(\omega) \bar{U} - I) R_f (\bar{U}^H \bar{\Phi}(\omega) \bar{U} - I)^H\} d\omega + \qquad (41)$$
$$\frac{\rho}{2\pi} \int_{-\pi}^{\pi} Tr\{\bar{U}^H \bar{\Phi}(\omega) \bar{U} (\bar{U}^H \bar{\Phi}(\omega) \bar{U}^H\} d\omega$$
$$= \frac{1}{2\pi} \int_{-\pi}^{\pi} p_t(\omega) Tr\{\bar{U} R_f \bar{U}^H (\bar{\Phi}(\omega) - I)^H (\bar{\Phi}(\omega) - I)\} d\omega +$$
$$\frac{\rho}{2\pi} \int_{-\pi}^{\pi} Tr\{\bar{\Phi}(\omega)\bar{\Phi}(\omega)^H\} d\omega$$

Assume that the frequency-domain correlation of the channel estimator matches that of the channel, i.e., $$\bar{r}_f[k] = r_f[k], \qquad (42)$$

for $k=1, \ldots, K$, and the time-domain correlation $r_t[m]$ is mismatched. Then $$\bar{U} R_f \bar{U}^H = \bar{D} = \text{diag}\{\bar{d}_1, \ldots, \bar{d}_K\} \qquad (43)$$

and $$MSE(\{\bar{c}[m,l,k]\}) = \sum_{l=1}^{K} \frac{\bar{d}_l}{2\pi} \int_{-\pi}^{\pi} pt(\omega)|\bar{\Phi}_l(\omega) - 1|^2 d\omega + \qquad (44)$$
$$\sum_{l=1}^{K} \frac{\rho}{2\pi} \int_{-\pi}^{\pi} |\bar{\Phi}_l(\omega)|^2 d\omega$$
$$= \sum_{l=1}^{K} \frac{\bar{d}_l}{2\pi} \int_{-\pi}^{\pi} [P_t(\omega) - \bar{p}_t(\omega)] |\bar{\Phi}_l(\omega) - 1|^2 d\omega +$$
$$\frac{p}{2\pi} \sum_{l=1}^{K} \frac{\bar{d}_l}{2\pi} \int_{-\pi}^{\pi} \bar{p}_t(\omega) \bar{p}_t(\omega) |\bar{\Phi}_l(\omega) - 1|^2 d\omega +$$
$$\sum_{l=1}^{K} \frac{p}{2\pi} \int_{-\pi}^{\pi} |\bar{\Phi}_l(\omega)|^2 dw$$
$$= \sum_{l=1}^{K} \frac{d_l}{2\pi} \int_{-\pi}^{\pi} [p_t(\omega) - \bar{p}_t(\omega)] |\bar{\Phi}_l(\omega) - 1|^2 d\omega +$$
$$\overline{MMSE}.$$

The first term in the above expression represents the MSE variation due to the mismatch. By means of equations (25) and (22), MSE ($\{\bar{c}[m,l,k]\}$) can be further simplified into $$MSE(\{\bar{c}[m,l,k]\}) = \sum_{l=1}^{K} \frac{\rho}{2\pi \bar{\gamma}_l^2[0]} \int_{-\pi}^{\pi} \frac{\bar{d}_l[p_t(\omega) - \bar{p}_t(\omega)]}{\bar{d}_l \bar{p}_t(\omega) + \rho} d\omega + \qquad (45)$$
$$\overline{MMSE}$$
$$= \rho \sum_{l=1}^{K} \frac{1}{\bar{\gamma}_l^2[0]} \left( \frac{1}{2\pi} \int_{-\pi}^{\pi} \frac{\bar{d}_l p_t(\omega) + \rho}{\bar{d}_l \bar{p}_t(\omega) + \rho} d\omega - 1 \right) +$$
$$\overline{MMSE}.$$

If $\bar{p}_t(s) = p_B(\omega)$, that is, the time-domain correlation of the designed estimator is ideal $\omega_{d_-}$ bandlimited, then, for any channels with $p_t(\omega)$ zero outside $[-\omega_d, \omega_d]$, and $$\frac{1}{2\pi} \int_{-\omega_d}^{\omega_d} p_t(\omega) d\omega = 1, \qquad (46)$$

we have $$\frac{1}{2\pi}\int_{-\pi}^{\pi}\frac{\bar{d}_l p_t(\omega)+\rho}{\bar{d}_l \bar{p}_t(\omega)+\rho}d\omega = 1. \quad (47)$$

Therefore, $$MSE(\{\bar{c}[m,l,k]\})=\overline{MMSE}_B(\omega_d). \quad (48)$$

Hence, if an OFDM channel estimator is designed using $p_B(\omega)$ as the time-domain correlation, then the time-domain correlation mismatch of the estimator will not degrade its performance. This suggests that a robust channel estimator should use $\rho_B(\omega)$ as the time-domain correlation.

To analyze a frequency-domain correlation mismatch, it is assumed that the time-domain correlation of the designed estimator is the same as that of the channel, that is $\bar{p}_t(\omega)=p(\omega)$, and the frequency-correlation matrix of the designed estimator has the same eigenvectors as that of the channel. That is, $R_f$ can be eigen-decomposed into $$R_f = \bar{U}^H D \bar{U}, \text{ or } \bar{U}R_f\bar{U}^H = D, \quad (49)$$

where $D=\text{diag}\{d_1, \ldots, d_K\}$ and $\Sigma K\ d_K=K$. $d_K$ and $\bar{d}_K$ for $k=1,\ldots,K$ are generally different.

Although the second assumption seems strange, it is in fact reasonable. As indicated in one paper, "On Channel Estimation in OFDM Systems," Van de Beek et al., Proc. of 45th IEEE Veh. Tech. Confd., pp. 815–819, July 1995, with tolerable leakage, both matrices $\bar{U}$ and U can be approximated by the discrete Fourier transform (DFT) matrix that is defined as $$W \triangleq \frac{1}{\sqrt{K}}\begin{pmatrix} 1 & 1 & \cdots & 1 \\ 1 & e^{j\frac{2\pi}{K}} & \cdots & e^{j\frac{2\pi(K-1)}{K}} \\ \vdots & \cdots & \cdots & \vdots \\ 1 & e^{j\frac{2\pi(K-1)}{K}} & \cdots & e^{j\frac{2\pi(K-1)(K-1)}{K}} \end{pmatrix}. \quad (50)$$

The leakage of the above approximation depends on the guard interval and the channel multipath delay profile. If the delay $\tau$ a path is an integer multiple of the sampling interval $T_S$, that is, $\tau=lT_S$, then all the energy from the path will be mapped to $d_l$. Otherwise, if the delay is a non-integer multiple of the sample interval, that is, $(l-1)T_S<\tau<lT_S$, then most of its energy will be contained in $d_{l-1}$ and $d_l$, although the energy will leak to all $d_k$'s. Hence, if the maximum delay spread is $t_d$, then for all $1\leq K_0$ ($K_0=\lceil Kt_d/T_f\rceil$), $d_l\approx 0$.

Applying the above two assumptions to (41), we get $$MSE(\{\bar{c}[m,l,k]\}) = \frac{1}{2\pi}\int_{-\pi}^{\pi}\bar{p}_t(\omega)Tr\{D(\Phi(\omega)-I)(\Phi(\omega)-I)^H\}d\omega + \quad (51)$$

$$\frac{\rho}{2\pi}\int_{-\pi}^{\pi}Tr\{\Phi(\omega)\Phi(\omega)^H\}d\omega$$

$$= \sum_{l=1}^{K}\frac{1}{2\pi}\int_{-\pi}^{\pi}d_l\bar{p}_t(\omega)|\Phi(\omega)-1|^2 d\omega +$$

$$\sum_{l=1}^{K}\frac{\rho}{2\pi}\int_{-\pi}^{\pi}|\Phi_l(\omega)|^2 d\omega$$

$$= \sum_{l=1}^{K}(d_l-\bar{d}_l)\frac{1}{2\pi}\int_{-\pi}^{\pi}\bar{p}_t(\omega)|\Phi(\omega)-1|^2 d\omega +$$

$$\overline{MMSE}$$

$$= \sum_{l=1}^{K}(d_l-\bar{d}_l)\Gamma(\bar{d}_l)+\overline{MMSE},$$

where, $$\Gamma(\bar{d}_l) \triangleq \frac{1}{2\pi\bar{\gamma}_l^2[0]}\int_{-\pi}^{\pi}\frac{p_t(\omega)}{\frac{\bar{d}_l}{\rho}\bar{p}_t(\omega)+1}d\omega. \quad (52)$$

In the above derivation, we have used equations (24) and (22). From its definition, $\Gamma(0)=1$ and $\Gamma(d)<1$ for any $d>0$.

If the channel estimator is designed such that $$\bar{d}_l = \begin{cases} K/K_0 & \text{for } 1\leq l\leq K_0, \\ 0 & \text{for } K_0+1\leq l\leq K, \end{cases} \quad (53)$$

then, for any channel with $d_l=0$ for $K_0+1\leq l\leq K$ and $\Sigma_{l=1}^{K_0}d_l=K$, we have $$MSE(\{\bar{c}[m,l,k]\})=\overline{MMSE}. \quad (54)$$

However, if $$\sum_{l=1}^{K_0}d_l < K, \quad (55)$$

then $$MSE(\{\bar{c}[m,l,k]\})>\overline{MMSE} \quad (56)$$

since $\Gamma(d)<\Gamma(0)$ for any $d>0$.

From the above discussion, a robust estimator, which is insensitive to the channel statistics, should have an ideal bandlimited time-domain correlation $$\bar{r}_t[n] = \mathcal{F}^{-1}p^B(\omega) = \frac{\sin(n\omega_d)}{n\omega_d}$$

and a frequency domain correlation matrix $$\begin{pmatrix} \bar{r}_f[0] & \cdots & \bar{r}_f[K-1] \\ \vdots & \ddots & \vdots \\ \bar{r}_f[-K+1] & \cdots & \bar{r}_f[0] \end{pmatrix} = W^H\bar{D}W, \quad (57)$$

where $$\bar{D} = \text{diag}\{\underbrace{K/K_0, \ldots, K/K_0}_{K_0 \text{ elements}}, 0, \ldots, 0\},$$

$$K_0 = \lceil \Delta f t_{\max} K\rceil = \lceil t_{\max}/T_f K\rceil, \text{ and } \omega_d = 2\pi T_f f_{\max}.$$

Note that W is the DFT matrix defined in equation (50). In this case, the average MSE of the robust estimator $$\overline{MMSE_B} = \frac{K_0\rho}{K}\left(1 - \frac{1}{\left[\frac{\pi K}{K_0\rho\omega_d} + 1\right]^{\frac{\omega_d}{\pi}}}\right) \quad (58)$$

For any channel with $f_d \leq f_{max}$ and $t_d \leq_{max}$, the average MSE should be $\overline{MMSE_B}$.

Figure 3A:
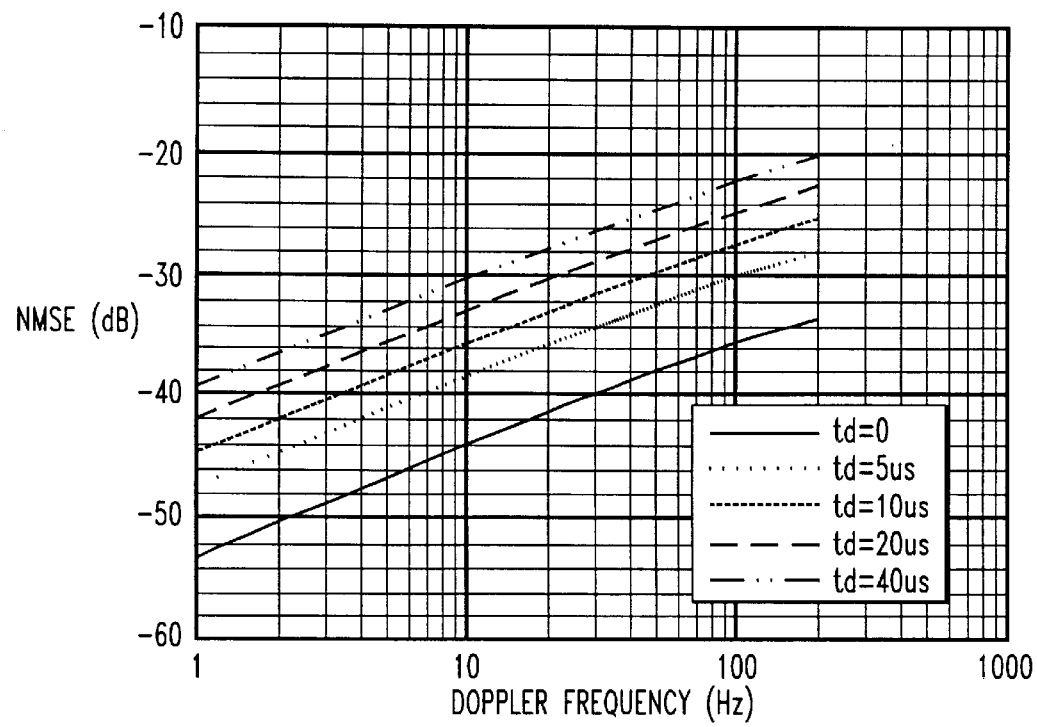
FIG. 3($a$) is a graph of NMSE of channel estimator versus Doppler frequency as a function of $t_d$ when SNR=10 dB.
Figure 3B:
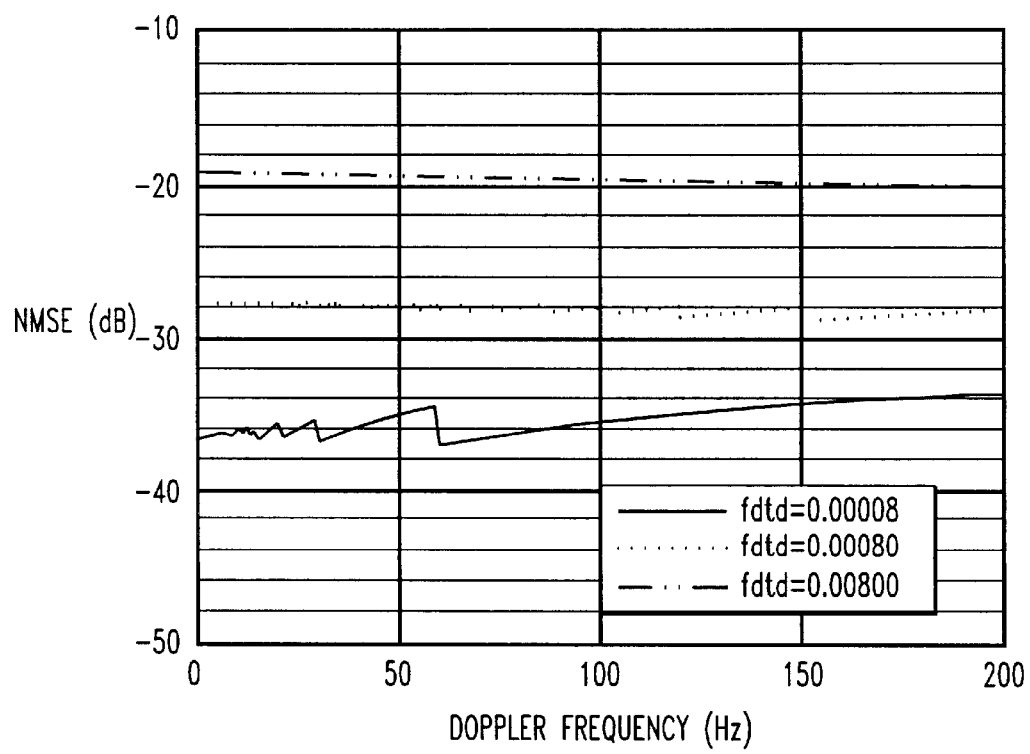
Figure 4A:
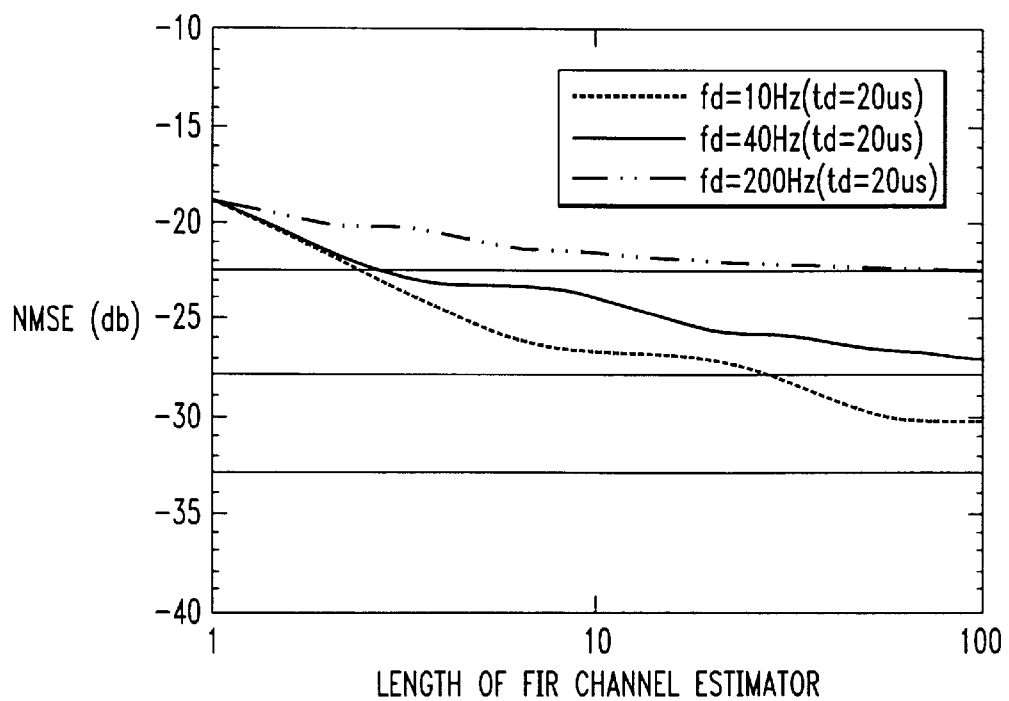
FIG. 4($a$) is a graph of NMSE versus the length of FIR channel estimator as a function of $f_d$ with $t_d$=20 $\mu$sec.
Figure 4B:
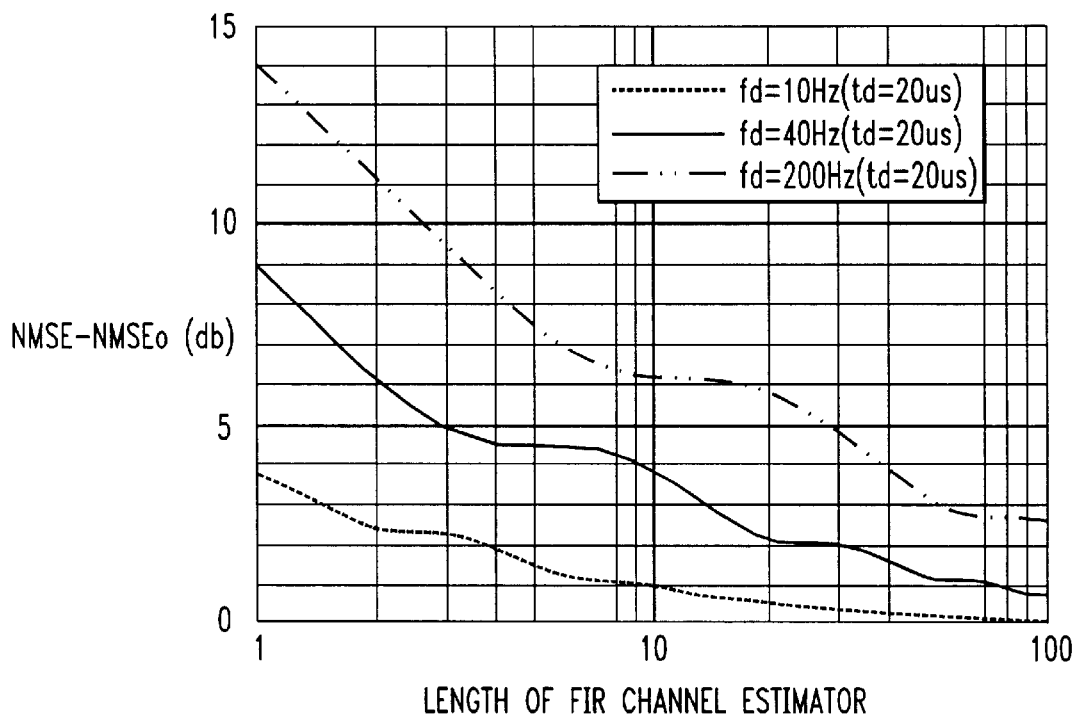
Figure 4C:
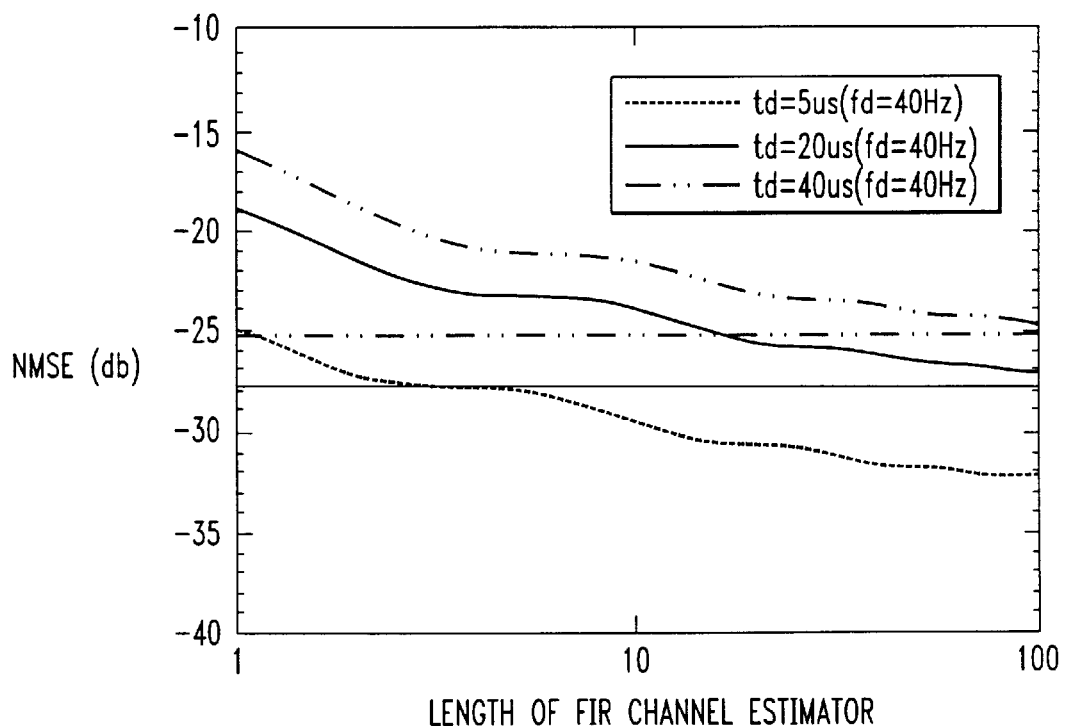
Figure 4D:
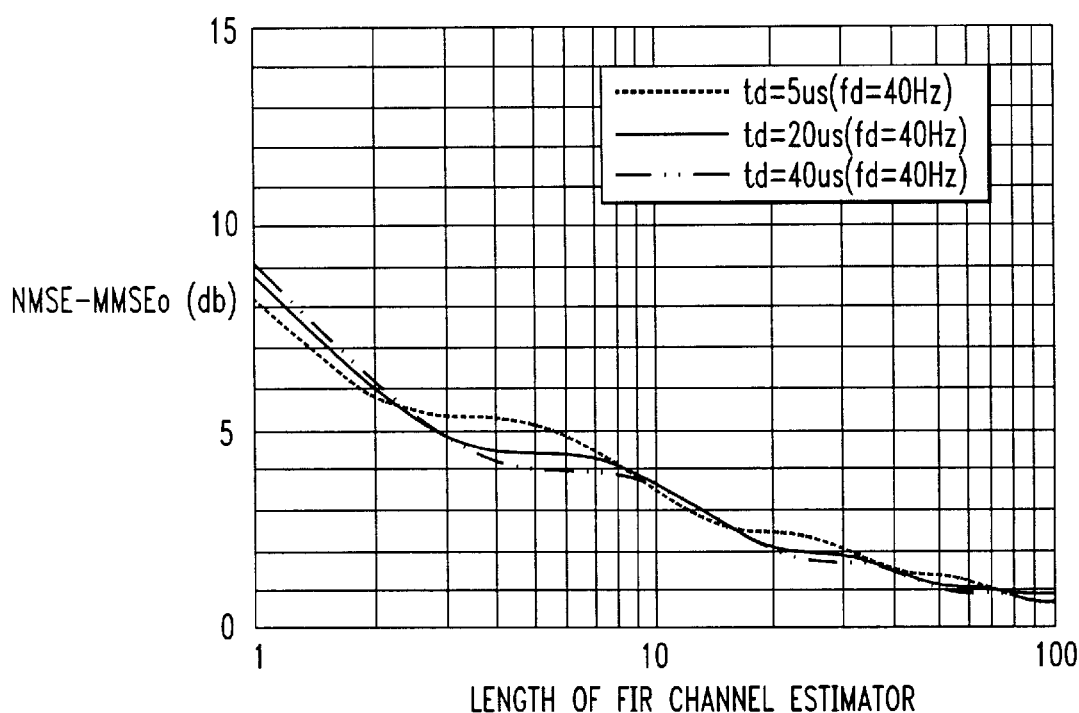

FIG. 3 shows an MSE of a robust estimator that matches different Doppler frequencies and delay spreads. As shown, the MSE is almost a constant if $t_{max}f_{max}$ is fixed. In particular, let $$\mu = \frac{2\rho t_{max}f_{max}}{r_b T_f} \quad (59)$$

For the ODFM systems satisfying $$\mu \ll 1 \text{ and } \frac{\omega_d}{\pi}\ln\frac{1}{\mu} \gg 1,$$

the average MSE of the robust channel estimator can be approximately expressed as $$\overline{MMSE_B} \approx \mu \ln\frac{1}{\mu}. \quad (60)$$

If the channel estimator is designed to match the Doppler spectrum given by equation (12), then from equation (29), we have $$\overline{MMSE_J} \approx \mu\left(\ln\frac{1}{\mu} - 0.1447\right). \quad (61)$$

Hence, compared with the estimator that tightly matches the Doppler spectrum, the performance degradation of the robust channel estimator is negligible Having identified a more specific example of a robust estimator, one can consider that it may be beneficial to provide a finite-tap robust estimator. Note that from the previous section for a robust estimator, $$\overline{R}_f = W^H \overline{D} W \text{ and } \overline{r}_t[t] = \frac{\sin(n\omega_d)}{n\omega_d}. \quad (62)$$

Let $$\begin{pmatrix} \tilde{r}_f[1,k] \\ \vdots \\ \tilde{r}_f[k,k] \\ \vdots \\ \tilde{r}_f[K,k] \end{pmatrix} = W \begin{pmatrix} \tilde{r}_f[k-1] \\ \vdots \\ \tilde{r}_f[0] \\ \vdots \\ \tilde{r}_f[-K+k] \end{pmatrix}, \quad (63)$$

and $$\begin{pmatrix} \tilde{c}[m,1,k] \\ \vdots \\ \tilde{c}[m,k,k] \\ \vdots \\ \tilde{c}[m,K,k] \end{pmatrix} = W \begin{pmatrix} \tilde{c}[m,k-1,k] \\ \vdots \\ \tilde{c}[m,0,k] \\ \vdots \\ \tilde{c}[m,-K+k,k] \end{pmatrix}, \quad (64)$$

where c[m, l, k] is the coefficient of the designed channel estimator. Then, from equation (15), for an FIR channel estimator with length L, we have $$\sum_{m=-(L-1)}^{0} \tilde{r}_t[n-m]\tilde{c}[m,l,k] - \tilde{r}_t[n]\vec{d}_l^\dagger \tilde{r}_f[l,k] + \rho d_{lc}^\dagger[n,l,k] = 0, \quad (65)$$

for n=0, −1, . . . , −(L−1). Note that $$\vec{d}_l^\dagger = \begin{cases} K_0/K & \text{if } l \leq K_0, \\ \text{and zero otherwise.} \end{cases} \quad (66)$$

From equation (65), it is obvious that c[n,l,k]=0 for l>$K_0$. For $1 \leq K_0$, $$\tilde{c}[-n,l,k] = \frac{\tilde{r}_f[l,k]}{K/K_0}c_n, \quad (67)$$

where $$(c_0, c_1, \ldots, c_{L-1})^T = \left(\overline{R}_T + \frac{K_0\rho}{K}I\right)^{-1}\tilde{r}_t, \quad (68)$$

$$\overline{R}_t = \begin{pmatrix} \tilde{r}_t[0] & \tilde{r}_t[1] & \cdots & \tilde{r}_t[L-1] \\ \tilde{r}_t[-1] & \tilde{r}_t[0] & \ddots & \tilde{r}_t[L-2] \\ \vdots & \ddots & \ddots & \vdots \\ \tilde{r}_t[-L+1] & \tilde{r}_t[-L+2] & \ddots & \tilde{r}_t[0] \end{pmatrix}, \quad (69)$$

and $$\tilde{r}_t = (\tilde{r}_t[0], \tilde{r}_t[1], \ldots, \tilde{r}_t[L-1])^T. \quad (70)$$

Using derivations similar to those above, the Fourier transform of the coefficient matrix of the designed FIR channel estimator is determined by $$\overline{C}(\omega) = W^H \Phi(\omega) W, \quad (71)$$

where $\Phi(\omega)$ is a diagonal matrix with $$\Phi(\omega) = \text{diag}\{\underbrace{c(\omega), \ldots, c(\omega)}_{K_0 \text{ elements}}, 0, \ldots, 0\} \quad (72)$$

and $c(\omega)$ is the Fourier transform of $c_n$. The estimation error of the FIR estimator can be found by $$\overline{MSE} = \frac{K_0 c_0 \rho}{K}. \quad (73)$$

Hence, for the robust FIR channel estimator, the U in FIG. 2 is the DFT matrix W and the $\Phi_k(\omega)$'s for k=1, . . . , K are $c(\omega)$.

In FIG. 4, the average MSE of a robust FIR channel estimator is shown as a function of its length. From the figure, for the estimator matching a 40 Hz maximum Doppler frequency, a 50-tap FIR estimator is needed to exploit the time-domain correlation of the channel parameters, while for one matching a 200 Hz maximum Doppler frequency, only a 5-tap channel estimator is sufficient.

Reference Generation and Computer Simulation

In this subsection section, the performance improvement of an OFDM system using a robust channel estimator will be demonstrated.

The simulation uses a two-path Rayleigh fading channel model with delay from 0 to 40 µs and Doppler frequency from 10 Hz to 200 Hz. The channels corresponding to different receivers have the same statistics. Two antennas are used for receiver diversity.

To construct an OFDM signal, assume the entire channel bandwidth, 800 kHz, is divided into 128 subchannels. The 4 subchannels on each end are used as guard tones, and the rest (120 tones) are used to transmit data. To make the tones orthogonal to each other, the symbol duration is 160 µsec. An additional 40 µsec guard interval is used to provide protection from intersymbol interference due to channel multipath delay spread. This results in a total block length $T_f$=200 µsec and a subchannel symbol rate $r_b$=5 kbaud.

To compare the performance of the OFDM system with and without the channel estimation, PSK modulation with coherent demodulation and differential PSK modulation with differential demodulation are used, respectively. A (40, 20) R-S code, with each code symbol consisting of 3 QPSK/DQPSK symbols grouped in frequency, is used in the system. Hence, each OFDM block forms a R-S codeword. The R-S decoder erases 10 symbols based on the signal strength and corrects 5 additional random errors. Hence, the simulated system can transmit data at 1.2 Mbits/sec before decoding, or 600 kbits/sec after decoding, over an 800 kHz channel.

An ideal reference is assumed in the derivation of the channel estimator. In practical systems, a reference can be generated during a training block. In subsequent blocks, a reference is generated using the received signals. Possible reference generating schemes include (but are not limited to):

1. Undecoded/decoded dual mode reference: If the decoder, in one example an R-S decoder, can successfully correct all errors in a OFDM block, the reference for the block can be generated by the decoded data; hence ã[n,k]=a[n,k]. Otherwise, ã[n, k]=â[n, k].
2. Undecoded reference: ã[n, k]=â[n, k], no matter whether the decoder can successfully correct all errors in a block, or not.
3. Decoded/CAM dual mode reference: Constant modulus algorithm (CMA) is one of most effective adaptive blind equalization algorithms. It can be also used to generate a reference for the OFDM channel estimator. If the R-S decoder can successfully correct all errors in a block, the reference for the block can be generated from the decoded data; hence ã[n, k]=a[n, k]. Otherwise, the reference can use the projection of y[n, k] on the unit circle, i.e., ã[n, k]=y[n, k]/y[n, k]|.
4. Error removal reference: If the decoder can successfully correct all errors in a block, the reference for the block can be generated by the decoded data. Otherwise, the Ĥ[n-k]'s are used instead of H̃[n,k]'s for k=1, . . . , K, respectively.

C. Simulation Results

FIGS. 5, 6, 7 and 8 demonstrate the performance of the channel estimator using different references under different channel conditions. To get insight into the average behavior of the channel estimator, the performance has been averaged over 10,000 OFDM blocks.

Figure 5A:
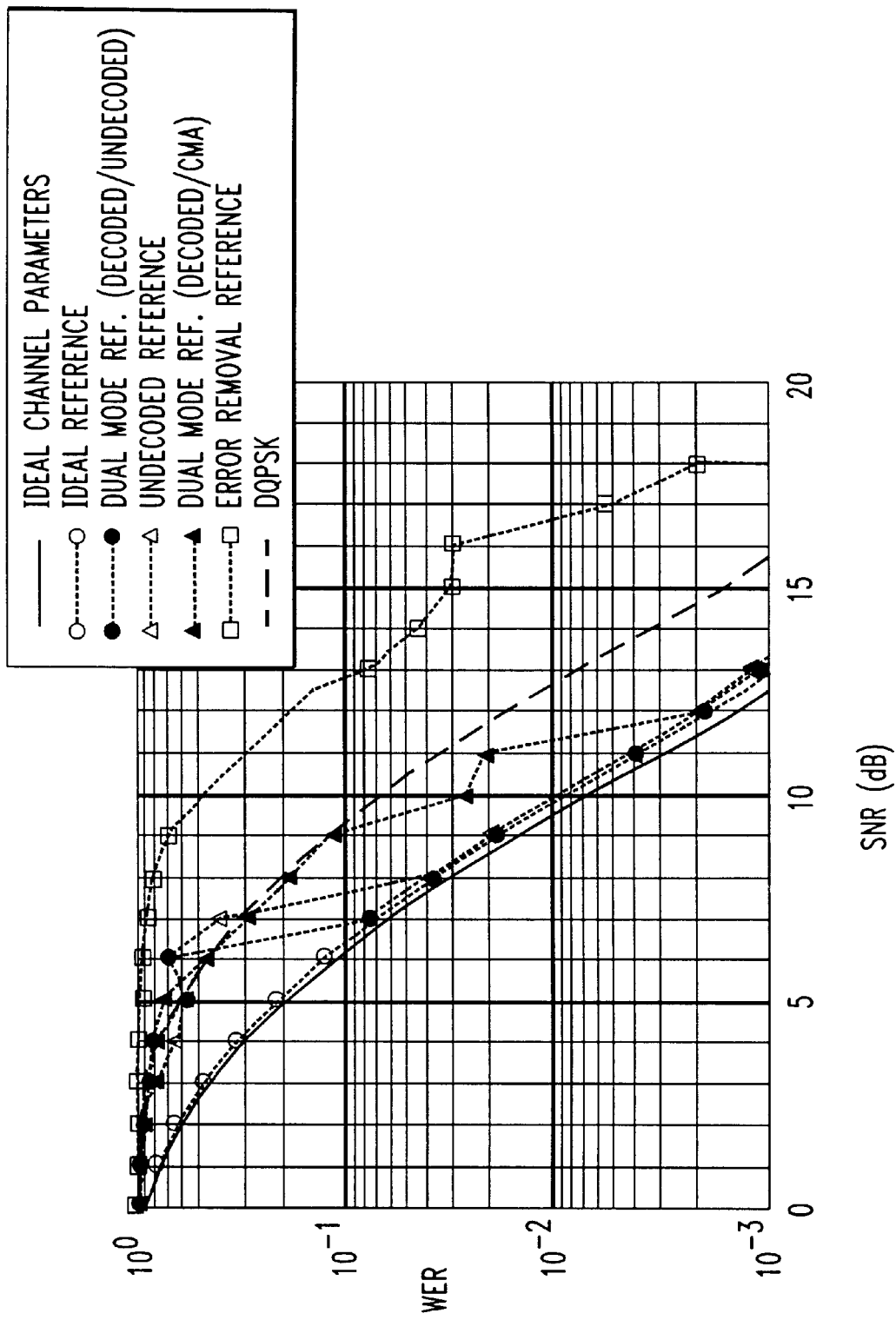
FIG. 5($a$) is a graph of WER versus SNR of a robust estimator as a function of various references, for a system without training blocks when the 50-tap channel estimator matches the channel with $f_d$=40 Hz and $t_d$=20 μsec.
FIG. 5(b) is a graph of NMSE versus SNR of a robust estimator as a function of various references, for a system without training blocks when the 50-tap channel estimator matches the channel with $f_d$=40 Hz and $t_d$=20 μsec.
Figure 5B:
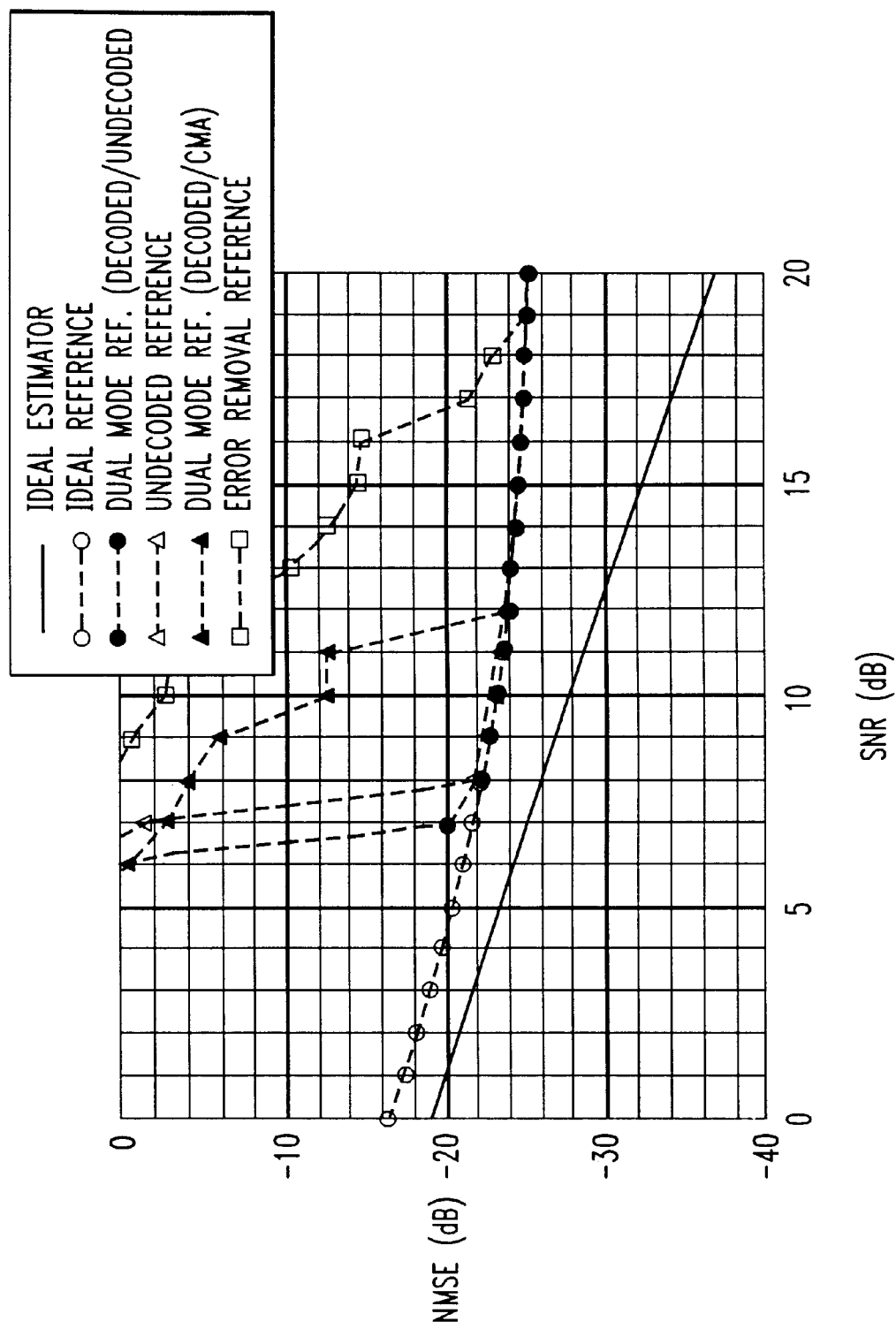

FIG. 5 shows a word error rate (WER) and normalized MSE (NMSE) for the OFDM system with only the first block as a training or synchronizing block and for a channel with $f_d$=40 Hz and $t_d$=20 µsec. From the figure, when SNR ≧8 dB, the channel estimator using the decoded/undecoded dual mode reference or the undecoded reference can estimate the channel parameters with NMSE as small as −22 dB. Hence, the WER of the system is almost the same as the performance assuming ideal knowledge of the channel parameters, which is about 3 dB better than using differential detection. However, due to error propagation through references, there is a noise threshold for the channel estimator. For the estimators with the decoded/undecoded dual mode reference and the undecoded reference, the noise thresholds are 7 and 8 dB respectively. For the estimators using the other two reference schemes, the noise thresholds are 12 and 19 dB, respectively, Once the SNR is larger than the noise threshold, the system performance will be significantly better than that of the OFDM system using DQPSK.

Figure 6A:
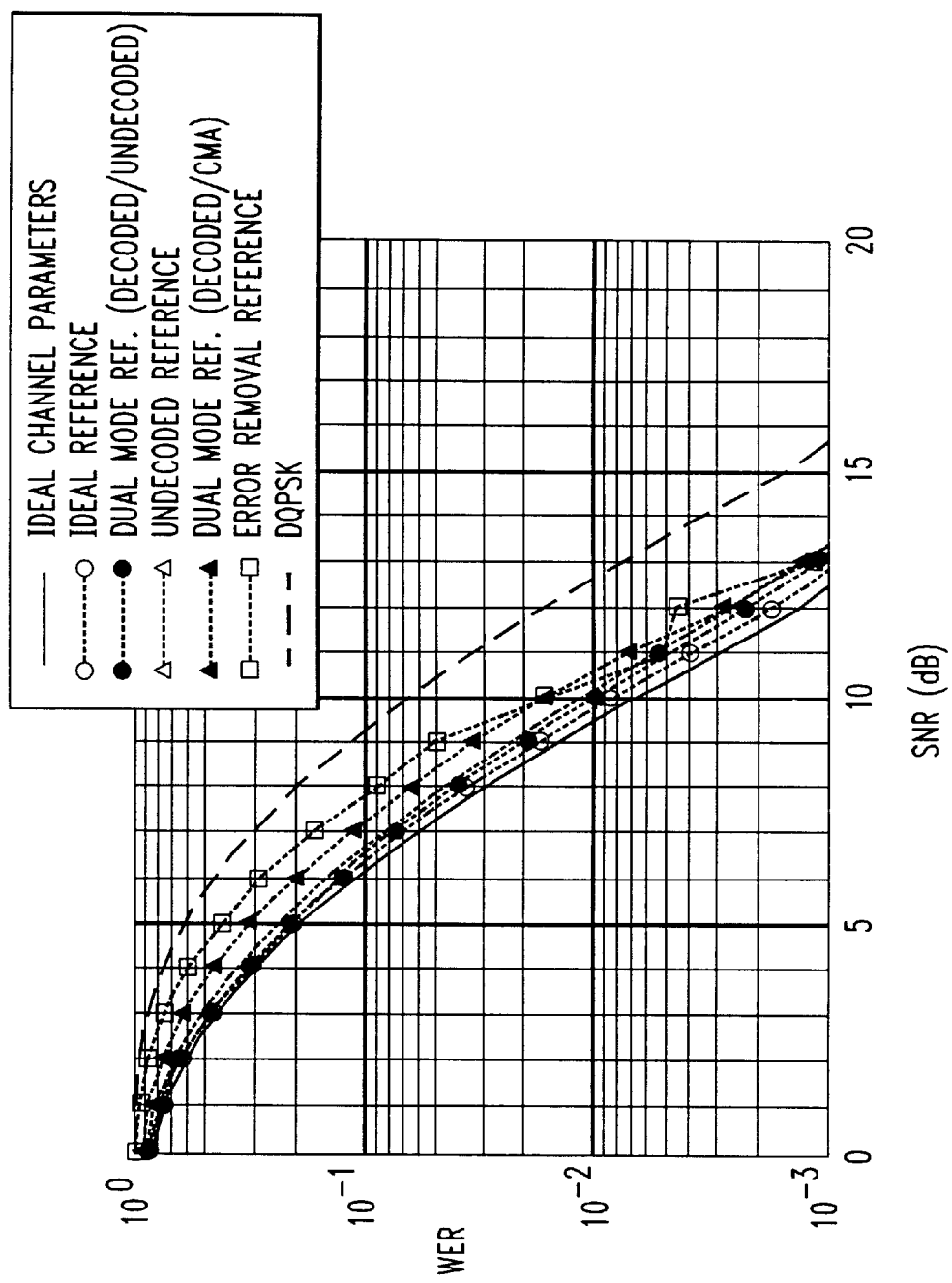
FIG. 6(a) is a graph of WVER versus SNR of a robust estimator as a function of various references, for a system with one percent training blocks when the 50-tap channel estimator matches the channel with $f_d$=40 Hz and $t_d$=20 μsec.
Figure 6B:
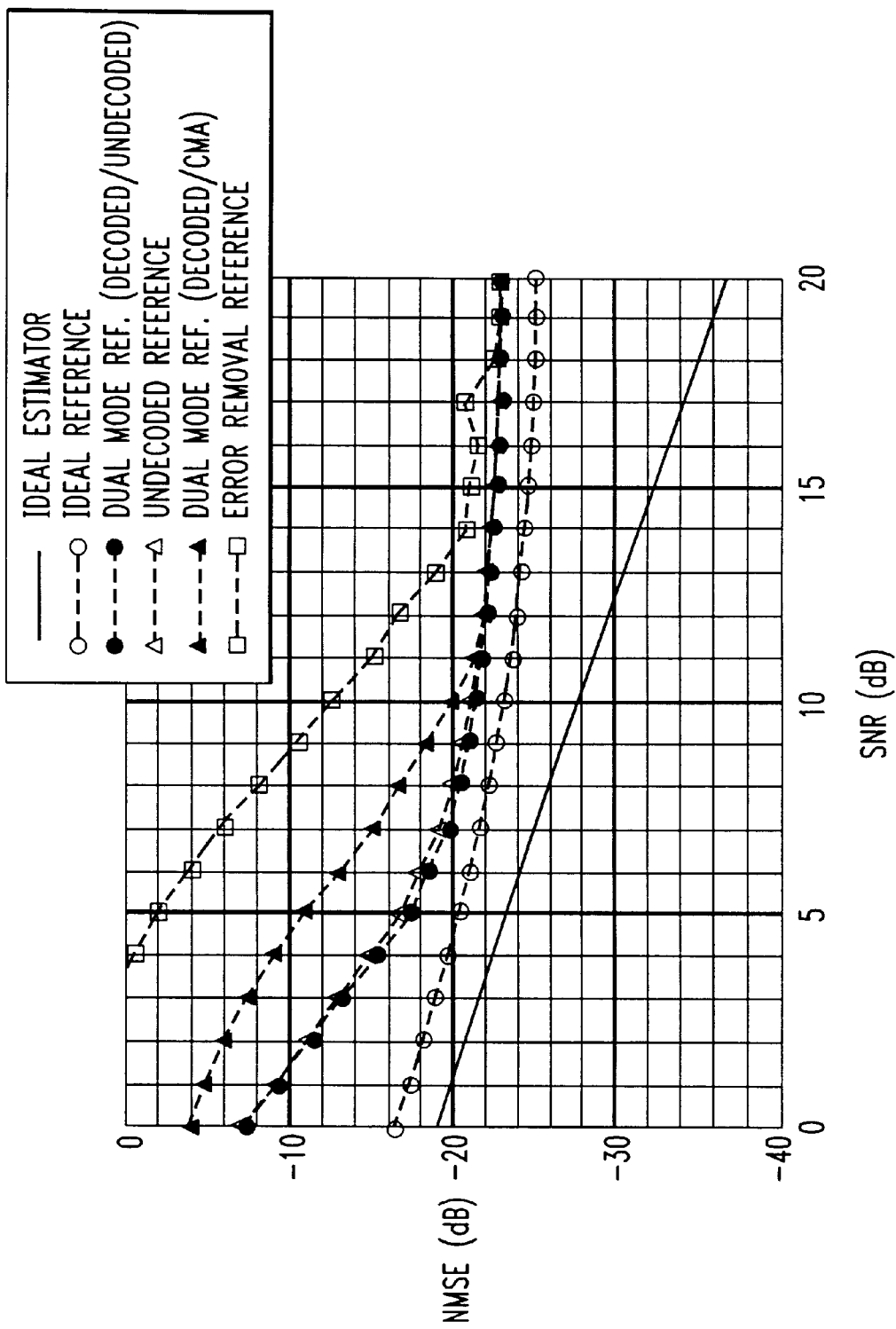
FIG. 6(b) is a graph of NMSE versus SNR of a robust estimator as a function of various references, for a system with one percent training blocks when the 50-tap channel estimator matches the channel with $f_d$=40 Hz and $t_d$=20 μsec.

To suppress the error propagation, training blocks are periodically inserted in the data stream. FIG. 6 illustrates the WER and NMSE for the systems with 1% training blocks. In this situation, the noise threshold disappears and hence the OFDM system with channel estimation has better performance than the one without channel estimation when the SNR ranges from 0 dB to 20 dB.

Figure 7A:
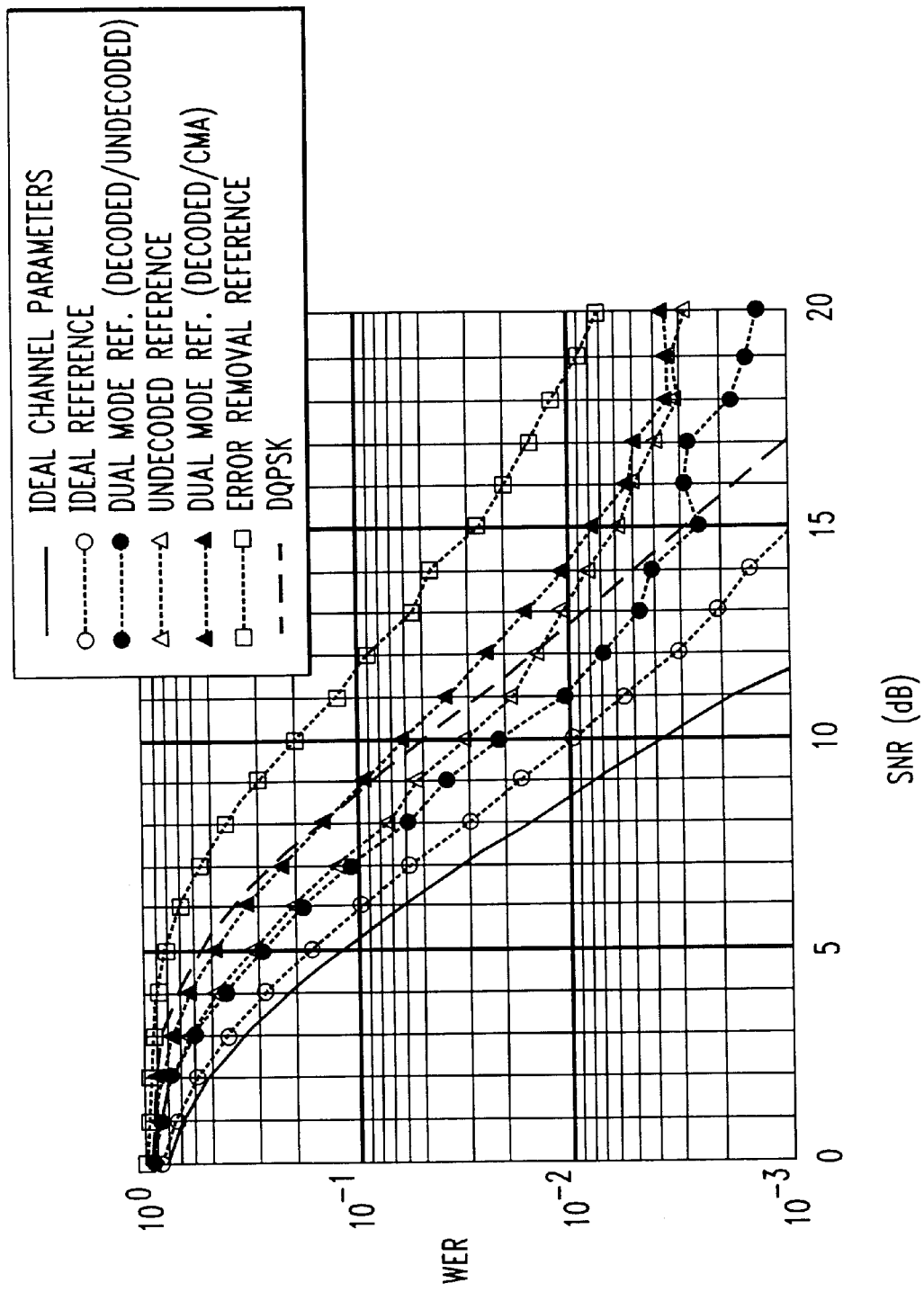
FIG. 7(a) is a graph of WER versus SNR of a robust estimator as a function of various references, for a system with one percent training blocks when the 50-tap channel estimator matches the channel with $f_d$=200 Hz and $t_d$=5 μsec.
Figure 7B:
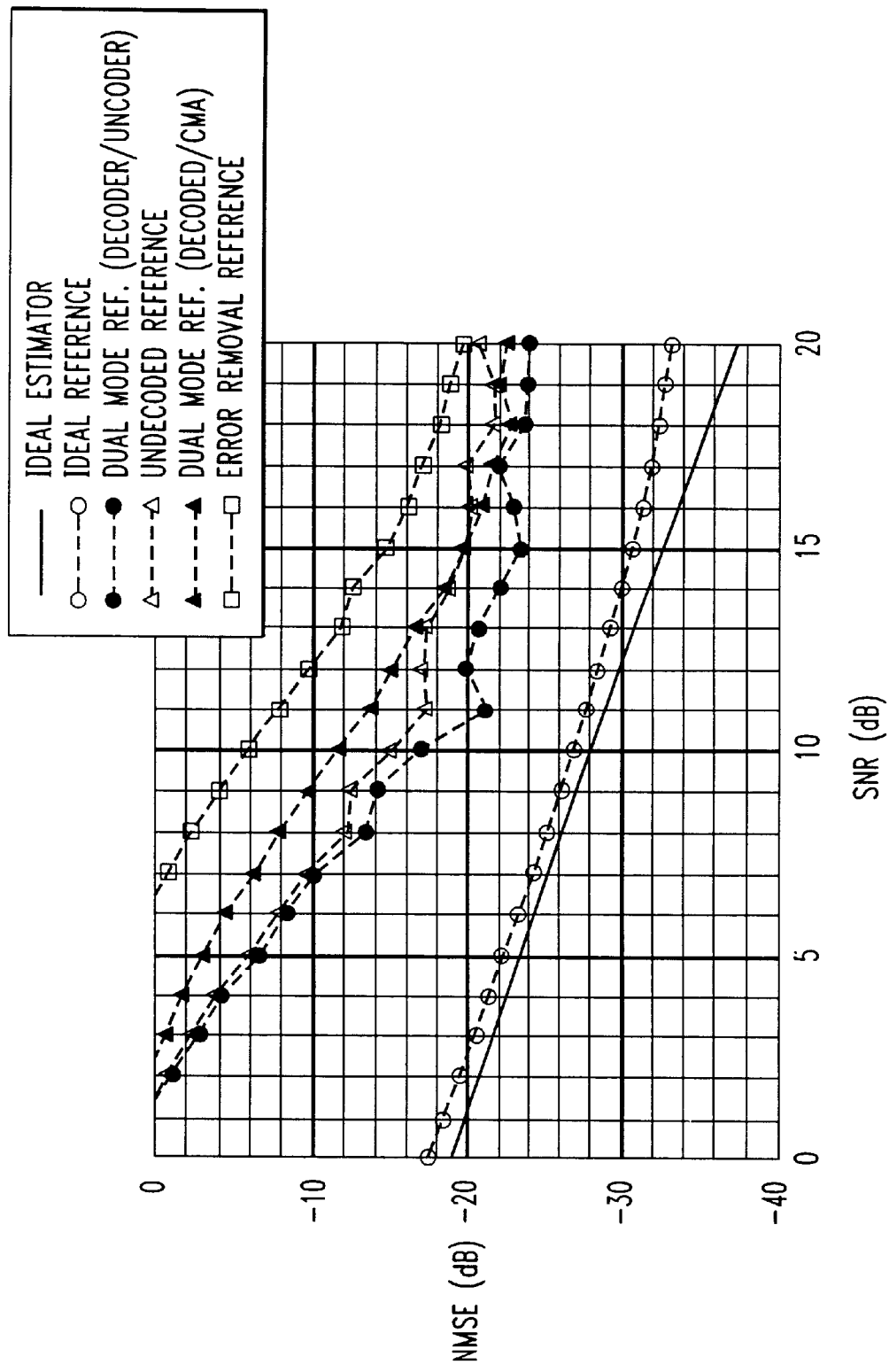
FIG. 7(b) is a graph of NMSE versus SNR of a robust estimator as a function of various references, for a system with one percent training blocks when the 50-tap channel estimator matches the channel with $f_d$=200 Hz and $t_d$=5 μsec.
Figure 8A:
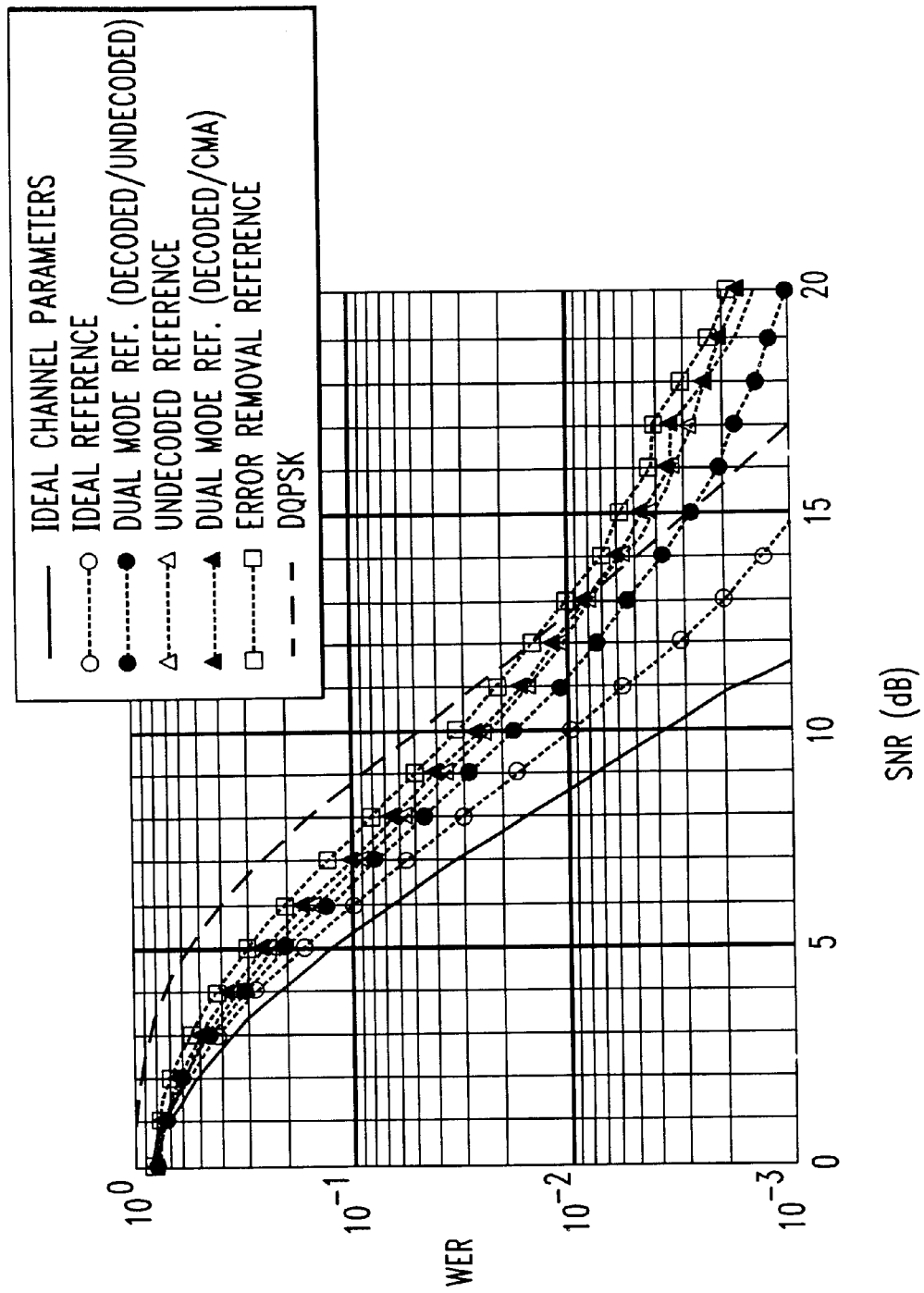
FIG. 8(a) is a graph of WER versus SNR of a robust estimator as a function of various references, for a system with ten percent training blocks when the 50-tap channel estimator matches the channel with $f_d$=200 Hz and $t_d$=5 μsec.
Figure 8B:
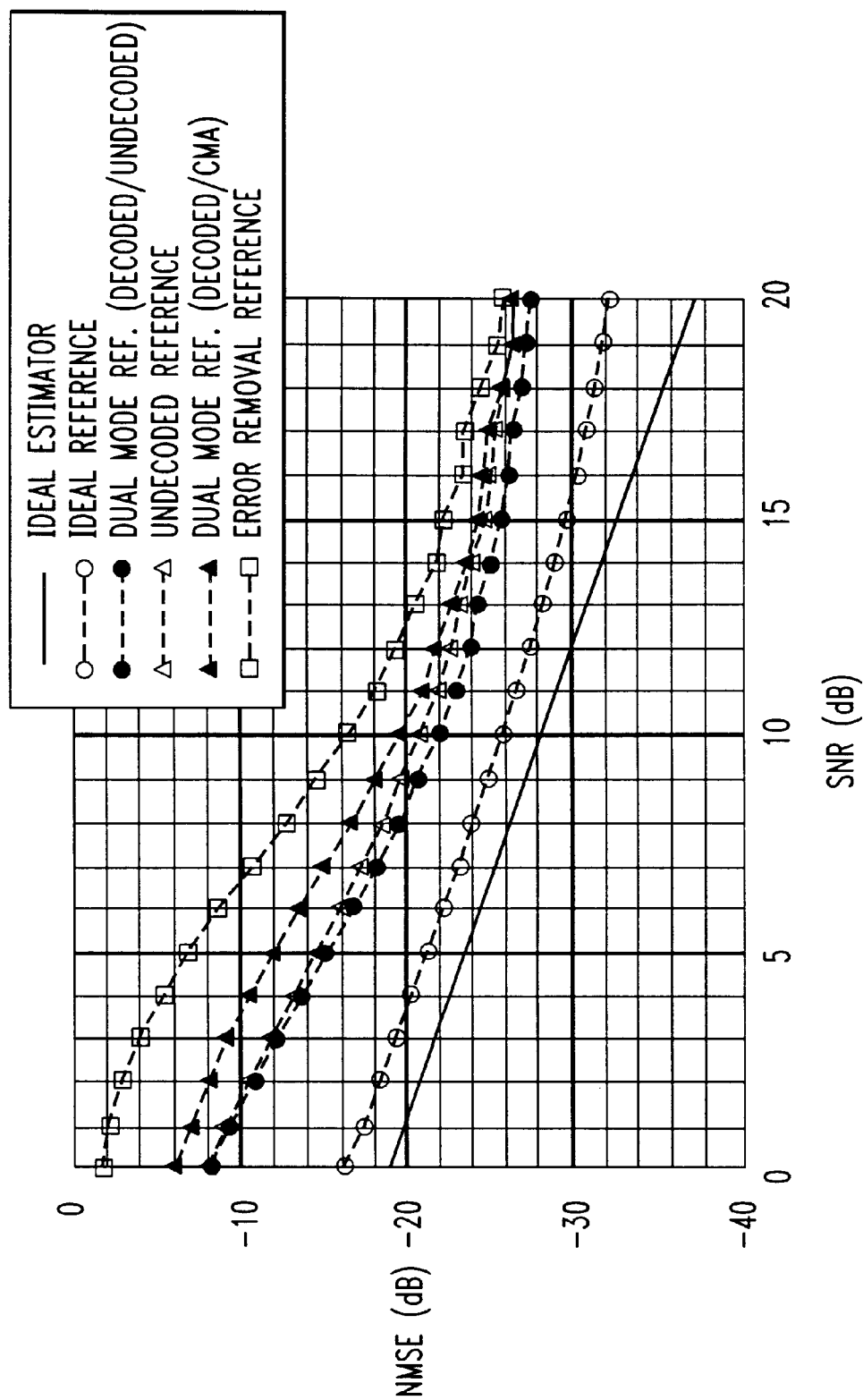
FIG. 8(b) is a graph of NMSE versus SNR of a robust estimator as a function of various references, for a system with ten percent training blocks when the 50-tap channel estimator matches the channel with $f_d$=200 Hz and $t_d$=5 μsec.

For a channel with a Doppler frequency as large as 200 Hz, as indicated in FIG. 7, if 1% training blocks are used, then the OFDM system with channel estimation has about a 1.5 dB SNR improvement compared to the one without channel estimation. If the training blocks are increased from 1% to 10% of the data, then the required SNR for WER= $10^{-2}$ is almost the same as before, as shown in FIG. 8.

Figure 9A:
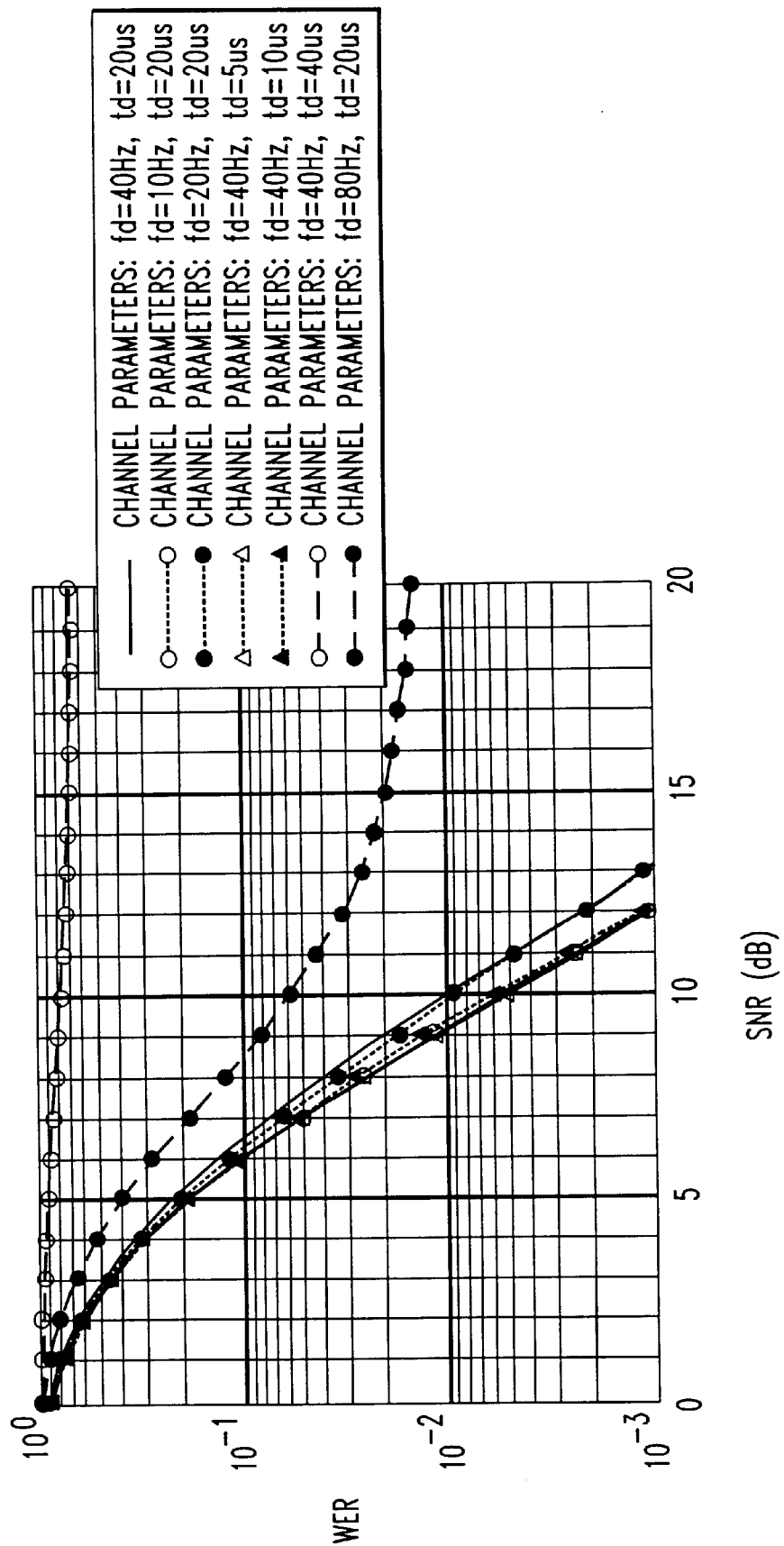
FIG. 9(a) is a graph of WER versus SNR of a 50-tap channel estimator matching $f_d$=40 Hz and $t_d$=20 used as a function of $f_d$ and $t_d$.

FIGS. 9 and 10 illustrate the robustness of the channel estimator of the present invention. As indicated in the analysis above, if a channel estimator is designed to match the channel with 40 Hz maximum Doppler frequency and 20 µsec maximum delay spread, then for all channels with $f_d$≦40 Hz and $t_d$≦20 µsec, the system performance is not worse than the channel with $f_d$=40 Hz and $t_d$20 µsec, as indicated by FIG. 9. However, for channels with $f_d$>40 Hz or $t_d$>20 µsec, such as, $f_d$=80 Hz and $t_d$=20 µsec, or $f_d$=40 Hz and $t_d$=40 µsec, the system performance degrades dramatically. On the other hand, as indicated in FIG. 10, if the estimator is designed to match the Doppler frequency or delay spread larger than the actual ones, the system performance degrades only slightly compared with estimation that exactly matches the channel Doppler frequency and delay spread.

Conclusion

A robust channel estimators for OFDM systems makes full use of the time-and frequency-correlations of the rapid dispersive fading wireless channel, and is insensitive to the channel statistics. Computer simulation demonstrates that channel estimation gives about 2.5 dB improvement when the Doppler frequency is 40 Hz, and about 1.5 dB improvement when the Doppler frequency is as large as 200 Hz. This channel estimation used together with antenna arrays has potential to provide significant suppression of co-channel interference in OFDM systems.

What is claimed is:

1. A method for estimating channel characteristics in a multicarrier transmission system, the method comprising the steps of:

receiving a multicarrier signal;

determining a reference signal based on the received multicarrier signal;

generating a temporal estimation of channel characteristics based on said reference signal; and generating a set of channel estimator characteristic coefficients using said reference signal, said step of generating coefficients comprising the substeps of:

transforming said temporal estimation of channel characteristics from the frequency domain;

time-filtering said transformed temporal estimation; and transforming to the frequency domain, the output of the step of time-filtering.

2. The method of claim 1 wherein said step of time filtering includes the substep of selecting time filter coefficients to match a maximum delay spread.

3. The method of claim 1 wherein said time filtering includes the substep of selecting time filter coefficients to match a rectangular spectrum.

4. The method of claim 1 wherein said temporal estimation comprises a plurality of components and said step of transforming the temporal estimation includes the substep of minimizing an effect of any of the plurality of components that does not satisfy a predetermined criterion.

5. A method for processing multicarrier signal in a receiver, the method comprising the steps of:

receiving a multicarrier signal at each of a plurality of antennas from a plurality of channels to provide a plurality of receiver inputs;

modifying the receiver inputs in accordance with an estimate of characteristics of the plurality of channels;

combining the modified receiver inputs; and generating a reference signal for estimating channel characteristics using a signal based on the combination of the modified receiver inputs, where said estimate of characteristics of the plurality of channels is generated in accordance with the substeps of;

generating a temporal estimate of channel characteristics based on the plurality of receiver inputs and the reference signal, transforming in the frequency-domain the temporal estimate of channel characteristics, time-filtering the transformed temporal estimate, and transforming in the frequency domain the output of the step of time filtering.

6. The method of claim 5 wherein said step of time-filtering includes the substep of selecting time filter coefficients to match a maximum delay spread.

7. The method of claim 5 wherein said time-filtering includes the substep of selecting time-filter coefficients to match a rectangular spectrum.

8. The method of claim 5 wherein said step of transforming the temporal estimate includes the step of minimizing an effect of any component of the temporal estimate that does not satisfy a predetermined criteria.

9. The method of claim 5 comprises the further steps of:

demodulating the combined modified receiver inputs;

decoding the demodulated combined modified receiver inputs; and receiving as inputs for generating the reference signal,
 i) the combination of the modified receiver inputs,
 ii) the demodulated combination of the modified receiver inputs, and
 iii) the decoded demodulated combination of the modified receiver inputs.

10. The method of claim 9 wherein said substep of decoding includes the step of applying a Reed-Solomon decoder to the demodulated combined modified receiver inputs.

11. The method of claim 9 wherein said step of generating a reference signal includes the substep of selecting one of the three inputs as influenced by a decoding success rate.

12. An apparatus for receiving a signal stream of a multicarrier signal, the apparatus comprising:

a plurality of antennas;

a channel estimator coupled to said plurality of antennas, said channel estimator including
 a first frequency domain transformer,
 a time-domain filter coupled to said first frequency-domain transformer, and
 a second frequency-domain transformer coupled to said time-domain filter, received signal adjusters coupled to said channel estimator;

a combiner coupled to said received signal adjusters;

a reference generator having an input coupled to said combiner and an output coupled to said channel estimator.

13. The apparatus of claim 12 further comprising:

a demodulator having an input coupled to an output of said combiner; and a decoder having an input coupled to an output of said demodulator, wherein said reference generator includes an input coupled to the output of said demodulator and an input coupled to the output of said decoder.

14. The apparatus of claim 12 wherein said time-domain filter includes coefficients selected to match a maximum delay spread.

15. The apparatus of claim 12 wherein said time-domain filter includes coefficients selected to match a rectangular spectrum.

16. An apparatus for estimating channel characteristics in a multicarrier transmission system, the apparatus comprising:

a first frequency-domain transformer, transforming from the frequency domain to the time-domain, wherein said first frequency domain transformer comprises a unitary linear inverse transformer;

a time-domain filter coupled to said frequency-domain transformer, wherein said time-domain filter includes coefficients selected to match a maximum delay spread; and a second frequency-domain transformer, transforming from the time-domain to the frequency domain, coupled to an output of said time-domain filter.

17. An apparatus for estimating channel characteristics in a multicarrier transmission system, the apparatus comprising:

a first frequency-domain transformer, transforming from the frequency domain to the time-domain, wherein said first frequency domain transformer comprises a unitary linear inverse transformer;

a time-domain filter coupled to said frequency-domain transformer, wherein said time-domain filter includes coefficients selected to match a rectangular spectrum; and a second frequency-domain transformer, transforming from the time-domain to the frequency domain, coupled to an output of said time-domain filter.

18. An apparatus for estimating channel characteristics in a multicarrier transmission system, the apparatus comprising:

a first frequency-domain transformer, transforming from the frequency domain to the time-domain;

a time-domain filter coupled to said frequency-domain transformer, wherein said time-domain filter includes coefficients selected to match a maximum delay spread; and a second frequency-domain transformer, transforming from the time-domain to the frequency domain, coupled to an output of said time-domain filter.

19. An apparatus for estimating channel characteristics in a multicarrier transmission system, the apparatus comprising:

a first frequency-domain transformer, transforming from the frequency domain to the time-domain;

a time-domain filter coupled to said frequency-domain transformer, wherein said time-domain filter includes coefficients selected to match a rectangular spectrum; and a second frequency-domain transformer, transforming from the time-domain to the frequency domain, coupled to an output of said time-domain filter.

* * * * *

UNITED STATES PATENT AND TRADEMARK OFFICE
CERTIFICATE OF CORRECTION

Figure 9B:
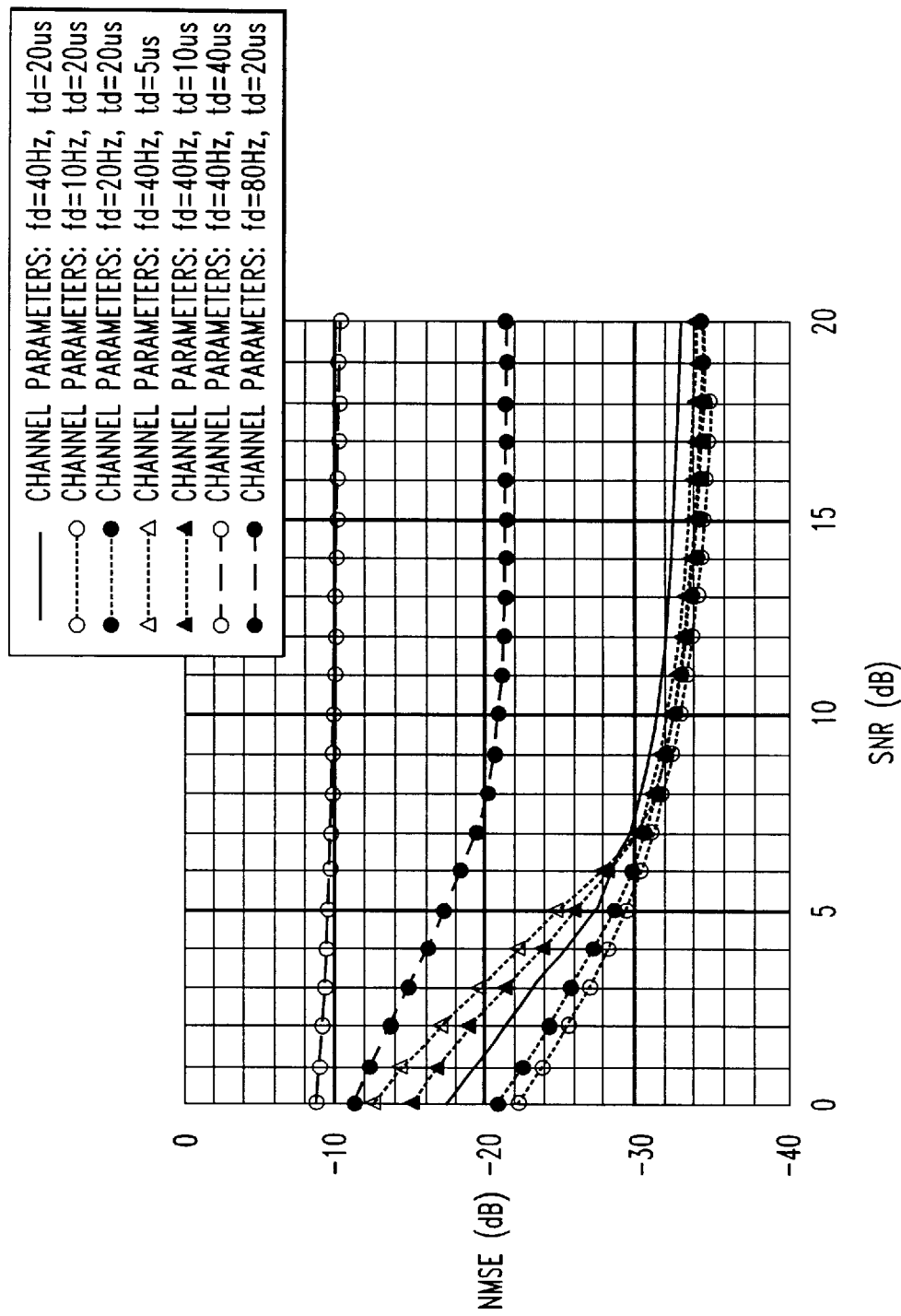
FIG. 9(b) is a graph of NMSE versus SNR of a 50-tap channel estimator matching $f_d$=40 Hz and $t_d$=20 usec as a function of $f_d$ and $t_d$.

PATENT NO.   : 6,327,314 B1
DATED        : December 4, 2001
INVENTOR(S)  : Leonard Joseph Cimini, Jr., Ye Li and Nelson Ray Sollenberger It is certified that error appears in the above-identified patent and that said Letters Patent is hereby corrected as shown below:

Drawings,
Sheet 15, FIG. 9B should appear as follows:

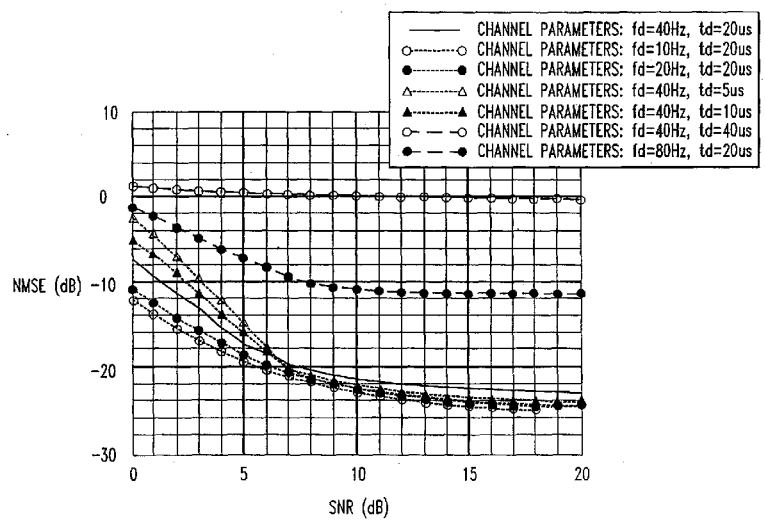

Figure 10A:
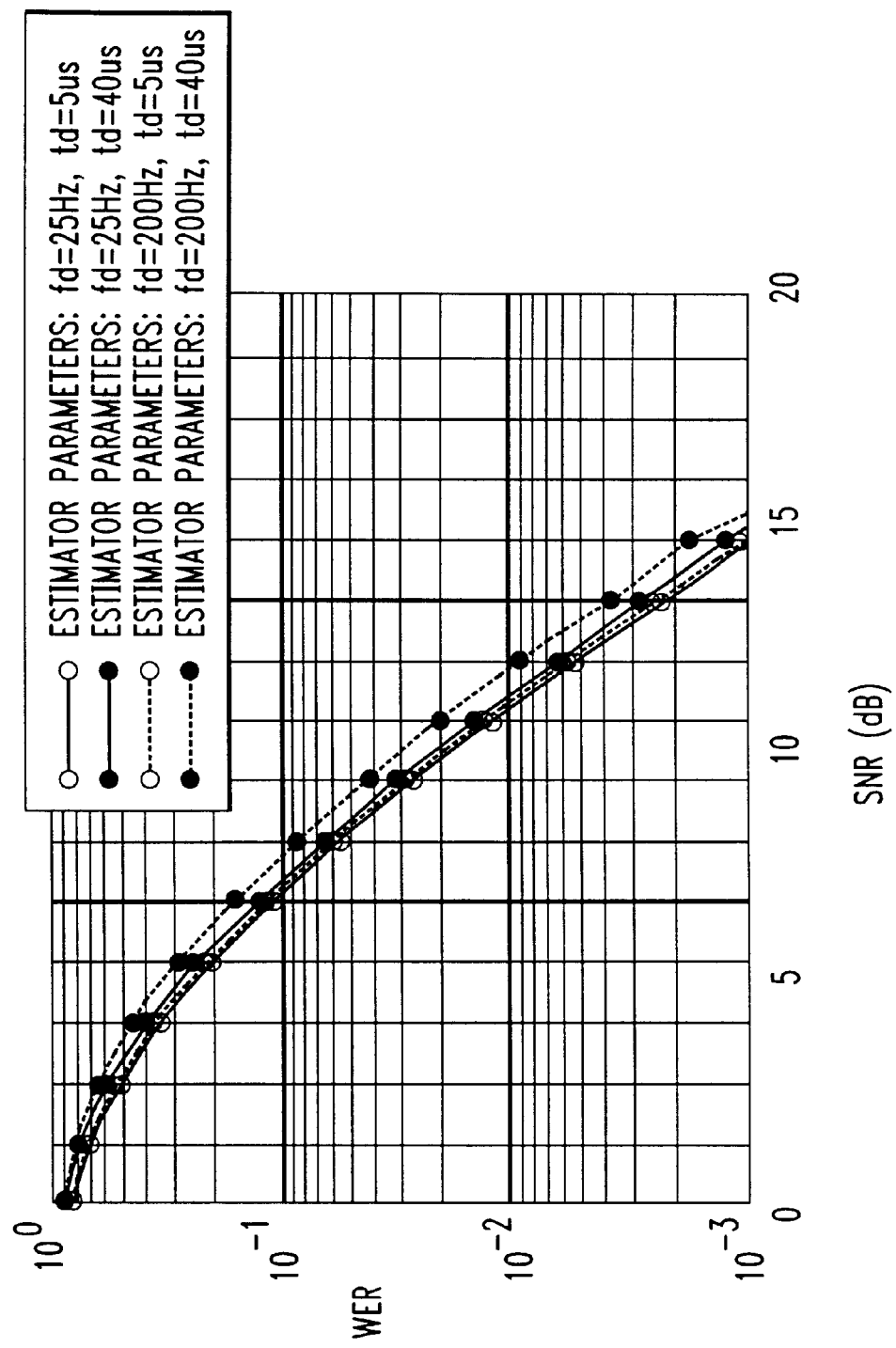
FIG. 10(a) is a graph of WER versus SNR of a 50-tap channel estimator matching various $f_d$'s and $t_d$'s for a channel with $f_d$=10 Hz and $t_d$=5 μsec.

Sheet 16, FIG. 10A should appear as follows:

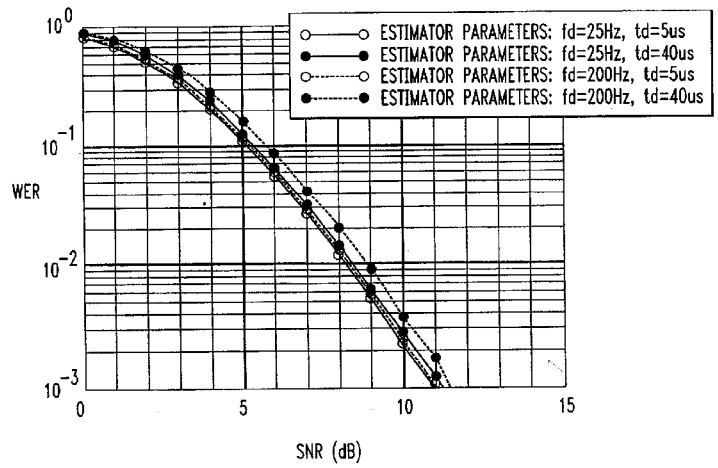

UNITED STATES PATENT AND TRADEMARK OFFICE
CERTIFICATE OF CORRECTION

Figure 10B:
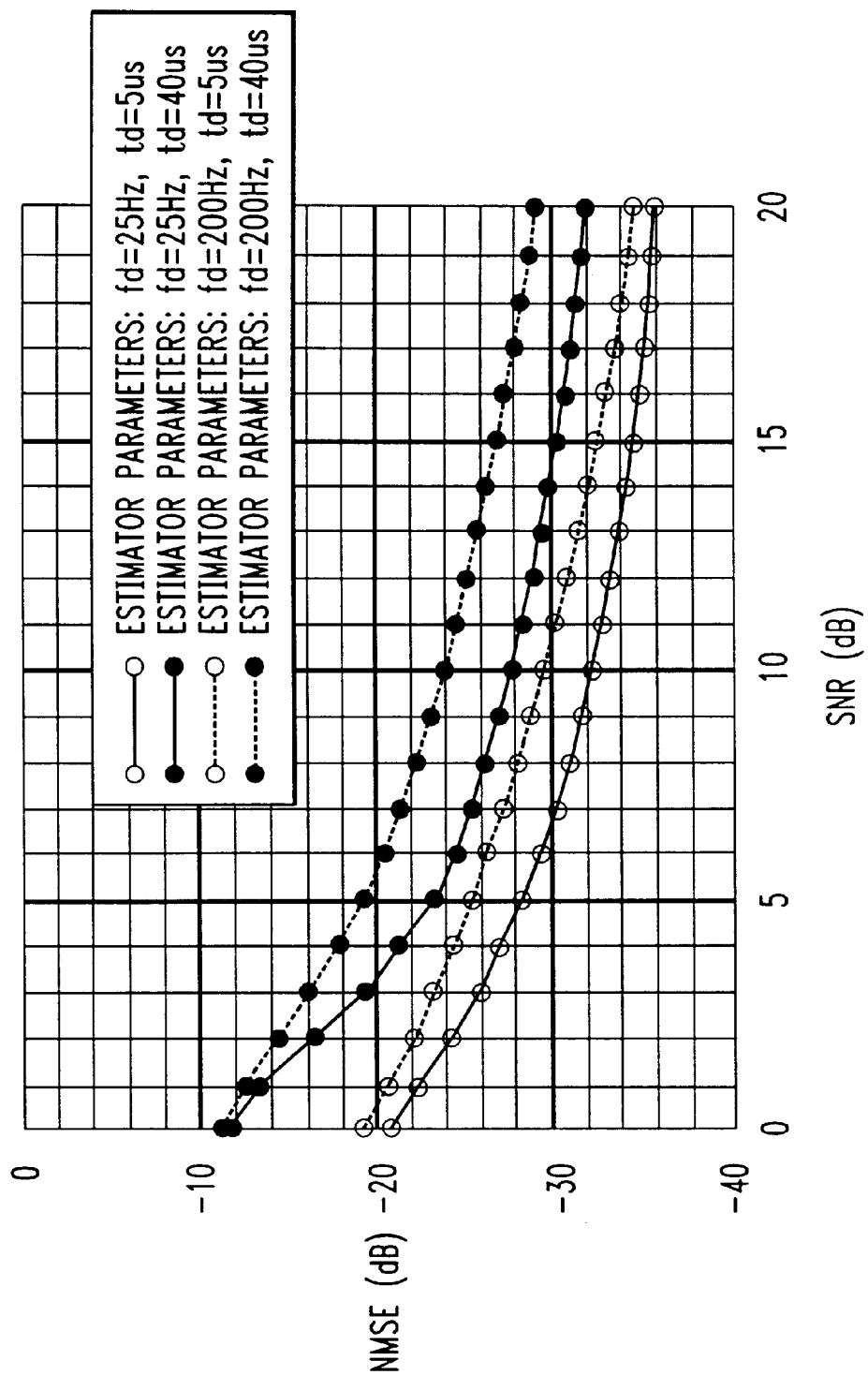
FIG. 10(b) is a graph of NMSE versus SNR of a 50-tap channel estimator matching various $f_d$'s and $t_d$'s for a channel with $f_d$=10 Hz and $t_d$=5 μsec.

PATENT NO. : 6,327,314 B1
DATED : December 4, 2001
INVENTOR(S) : Leonard Joseph Cimini, Jr., Ye Li and Nelson Ray Sollenberger It is certified that error appears in the above-identified patent and that said Letters Patent is hereby corrected as shown below:

<u>Drawings (cont'd),</u>
Sheet 17, FIG. 10B should appear as follows:

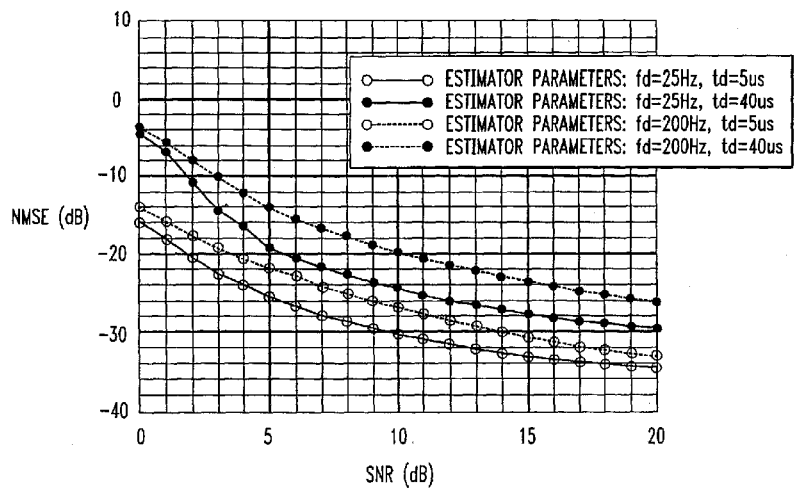

Signed and Sealed this

Twentieth Day of May, 2003

JAMES E. ROGAN
*Director of the United States Patent and Trademark Office*